US011763380B2

(12) United States Patent
Melling et al.

(10) Patent No.: US 11,763,380 B2
(45) Date of Patent: Sep. 19, 2023

(54) ENSURING THE ACCURATENESS AND CURRENTNESS OF INFORMATION PROVIDED BY THE SUBMITTER OF AN ELECTRONIC INVOICE THROUGHOUT THE LIFE OF A MATTER

(71) Applicant: Thomson Reuters Enterprise Centre GmbH, Zug (CH)

(72) Inventors: Thomas G. Melling, Sammamish, WA (US); Ronald G. Wencel, Frankfort, IL (US); Gregory P. Shriber, Issaquah, WA (US); Richard D. Boone, Kirkland, WA (US); Donald Murray, Bellevue, WA (US); Robert Thomas, Mercer Island, WA (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 54 days.

(21) Appl. No.: 16/869,649

(22) Filed: May 8, 2020

(65) Prior Publication Data
US 2020/0294122 A1 Sep. 17, 2020

Related U.S. Application Data

(60) Continuation of application No. 13/632,760, filed on Oct. 1, 2012, now Pat. No. 10,672,068, which is a division of application No. 12/566,468, filed on Sep. 24, 2009, now Pat. No. 8,280,812, which is a continuation of application No. 10/864,290, filed on Jun. 9, 2004, now Pat. No. 7,617,154.

(60) Provisional application No. 60/497,247, filed on Aug. 22, 2003, provisional application No. 60/497,246, (Continued)

(51) Int. Cl.
 *G06Q 40/00* (2023.01)
 *G06Q 20/10* (2012.01)
 *G06Q 10/0639* (2023.01)

(52) U.S. Cl.
 CPC ......... *G06Q 40/00* (2013.01); *G06Q 10/0639* (2013.01); *G06Q 20/102* (2013.01)

(58) Field of Classification Search
 USPC .................................... 705/7.11, 40, 35, 1.1
 See application file for complete search history.

(56) References Cited

U.S. PATENT DOCUMENTS

| 5,216,592 A | 6/1993 | Mann et al. |
| 5,765,140 A | 6/1998 | Knudson et al. |
| 5,893,905 A | 4/1999 | Main et al. |

(Continued)

FOREIGN PATENT DOCUMENTS

| WO | WO-0244981 A1 * | 6/2002 | ........... G06Q 10/109 |

OTHER PUBLICATIONS

U.S. Appl. No. 11/415,361, Boone et al.
(Continued)

*Primary Examiner* — William E Rankins
(74) *Attorney, Agent, or Firm* — Norton Rose Fulbright US LLP

(57) ABSTRACT

A facility for insuring information currentness is described. The facility receives from a party a request to submit an invoice. In response to receiving a request, the facility tests the currentness of information to be provided by the party. The facility permits the party to submit an invoice in connection with the request only if the testing determines that the information to be provided by the party is current.

14 Claims, 26 Drawing Sheets

Related U.S. Application Data filed on Aug. 22, 2003, provisional application No. 60/477,425, filed on Jun. 9, 2003.

(56) References Cited

U.S. PATENT DOCUMENTS

| | | | |
|---|---|---|---|
| 5,907,490 | A | 5/1999 | Oliver |
| 5,991,733 | A | 11/1999 | Aleia et al. |
| 5,991,742 | A | 11/1999 | Tran |
| 6,058,380 | A | 5/2000 | Anderson et al. |
| 6,233,565 | B1 | 5/2001 | Lewis et al. |
| 6,247,047 | B1 | 6/2001 | Wolff |
| 6,421,683 | B1 | 7/2002 | Lamburt |
| 6,523,027 | B1 | 2/2003 | Underwood |
| 6,550,057 | B1 | 4/2003 | Bowman-Amuah |
| 6,601,233 | B1 | 7/2003 | Underwood |
| 6,609,128 | B1 | 8/2003 | Underwood |
| 6,629,081 | B1 | 9/2003 | Cornelius et al. |
| 6,633,878 | B1 | 10/2003 | Underwood |
| 6,697,824 | B1 | 2/2004 | Bowman-Amuah |
| 6,804,785 | B2 | 10/2004 | Steele et al. |
| 6,882,986 | B1 | 4/2005 | Heinemann et al. |
| 6,988,249 | B1 | 1/2006 | Arvanitis et al. |
| 7,013,290 | B2 | 3/2006 | Ananian |
| 7,065,496 | B2 | 6/2006 | Subbloie et al. |
| 7,249,059 | B2 | 7/2007 | Dean et al. |
| 7,305,392 | B1 | 12/2007 | Abrams et al. |
| 7,406,427 | B1 | 7/2008 | Guyan et al. |
| 7,437,327 | B2 | 10/2008 | Lam et al. |
| 7,519,702 | B1 | 4/2009 | Allan |
| 7,617,154 | B1 | 11/2009 | Melling et al. |
| 7,689,482 | B2 | 3/2010 | Lam et al. |
| 7,693,759 | B2 | 4/2010 | Alberti et al. |
| 7,707,055 | B2 | 4/2010 | Behmoiras et al. |
| 7,814,012 | B2 | 10/2010 | Johnson |
| 8,108,428 | B1 | 1/2012 | Wencel et al. |
| 8,121,908 | B2 | 2/2012 | Oney et al. |
| 8,140,691 | B2 | 3/2012 | Kogan et al. |
| 8,280,812 | B1 | 10/2012 | Melling et al. |
| 2001/0032170 | A1 | 10/2001 | Sheth |
| 2001/0042032 | A1 | 11/2001 | Crawshaw et al. |
| 2002/0023030 | A1 | 2/2002 | Prohaska et al. |
| 2002/0040352 | A1 | 4/2002 | McCormick |
| 2002/0046147 | A1 | 4/2002 | Livesay et al. |
| 2002/0049751 | A1 | 4/2002 | Chen et al. |
| 2002/0073077 | A1 | 6/2002 | Lennon |
| 2002/0099577 | A1 | 7/2002 | Black |
| 2002/0111824 | A1 | 8/2002 | Grainger |
| 2002/0111897 | A1 | 8/2002 | Davis |
| 2002/0111953 | A1 | 8/2002 | Snyder |
| 2002/0112186 | A1 | 8/2002 | Ford et al. |
| 2002/0129106 | A1 | 9/2002 | Gutfreund |
| 2002/0138449 | A1 | 9/2002 | Kendall et al. |
| 2002/0143960 | A1 | 10/2002 | Goren et al. |
| 2002/0156697 | A1 | 10/2002 | Okuhara et al. |
| 2002/0156797 | A1 | 10/2002 | Lee et al. |
| 2002/0173934 | A1 | 11/2002 | Potenza |
| 2002/0184131 | A1 | 12/2002 | Gatto |
| 2002/0194081 | A1 | 12/2002 | Perkowski |
| 2002/0198791 | A1 | 12/2002 | Perkowski |
| 2003/0018543 | A1 | 1/2003 | Alger et al. |
| 2003/0033226 | A1 | 2/2003 | Anderson |
| 2003/0046169 | A1* | 3/2003 | Fraser .................. G06Q 30/02 705/26.81 |
| 2003/0069839 | A1 | 4/2003 | Whittington et al. |
| 2003/0074248 | A1 | 4/2003 | Braud et al. |
| 2003/0097342 | A1 | 5/2003 | Whittingtom |
| 2003/0135500 | A1* | 7/2003 | Chevrel ................ G06F 16/958 707/999.009 |
| 2003/0144969 | A1 | 7/2003 | Coyne |
| 2003/0144970 | A1 | 7/2003 | Coyne |
| 2003/0149765 | A1 | 8/2003 | Hubbard et al. |
| 2003/0188175 | A1 | 10/2003 | Volk et al. |
| 2003/0208384 | A1* | 11/2003 | Nelson .................. G06Q 40/08 705/4 |
| 2003/0212609 | A1 | 11/2003 | Blair et al. |
| 2004/0006594 | A1 | 1/2004 | Boyer et al. |
| 2004/0010443 | A1 | 1/2004 | May et al. |
| 2004/0019528 | A1 | 1/2004 | Broussard et al. |
| 2004/0030667 | A1 | 2/2004 | Xu et al. |
| 2004/0034578 | A1 | 2/2004 | Oney et al. |
| 2004/0059628 | A1 | 3/2004 | Parker et al. |
| 2004/0064389 | A1 | 4/2004 | Force et al. |
| 2004/0093302 | A1 | 5/2004 | Baker et al. |
| 2004/0103040 | A1 | 5/2004 | Ronaghi et al. |
| 2004/0138944 | A1 | 7/2004 | Whitacre et al. |
| 2004/0172588 | A1 | 9/2004 | Mattaway |
| 2004/0215533 | A1 | 10/2004 | Doeberl et al. |
| 2004/0215542 | A1* | 10/2004 | Rossides ................ G06Q 40/00 705/35 |
| 2004/0215633 | A1 | 10/2004 | Harris |
| 2004/0243483 | A1 | 12/2004 | Baumann et al. |
| 2004/0249655 | A1 | 12/2004 | Doeberl et al. |
| 2005/0027586 | A1 | 2/2005 | Bacon et al. |
| 2005/0033598 | A1 | 2/2005 | Knapp et al. |
| 2005/0049966 | A1 | 3/2005 | Melling et al. |
| 2005/0144125 | A1 | 6/2005 | Erbey et al. |
| 2005/0203800 | A1 | 9/2005 | Sweeney et al. |
| 2005/0203814 | A1 | 9/2005 | Derry et al. |
| 2005/0216395 | A1 | 9/2005 | Behmoiras et al. |
| 2005/0278232 | A1 | 12/2005 | Bruffey et al. |
| 2006/0074919 | A1* | 4/2006 | Grover .................. G06Q 30/02 |
| 2007/0061260 | A1 | 3/2007 | deGroeve et al. |
| 2007/0061734 | A1* | 3/2007 | Abdulhayoglu ....... G06F 21/645 715/742 |
| 2008/0189208 | A1* | 8/2008 | Wilkie ................... G06Q 20/14 705/40 |
| 2010/0262524 | A1 | 10/2010 | Wu |
| 2011/0270749 | A1* | 11/2011 | Bennett ................ G06Q 20/102 705/40 |

OTHER PUBLICATIONS

U.S. Appl. No. 11/847,258, Melling et al.
U.S. Appl. No. 13/348,289, Wencel et al.
"DataCert Announces Availability of Cost Management and Workflow Tool: Web-Based Software Boosts ROI and Automates Invoice Management," Business Editors & High-Tech/Legal Writers, Business Wire, New York: Jun. 21, 2002, p. 1, 3 pp.
Non-Final Office Action for U.S. Appl. No. 10/864,290, dated Dec. 27, 2007, 19 pages.
Non-Final Office Action for U.S. Appl. No. 10/923,606, dated Jun. 11, 2008, 18 pages.
Non-Final Office Action for U.S. Appl. No. 10/864,290, dated Jul. 9, 2008, 18 pages.
Non-Final Office Action for U.S. Appl. No. 11/001,630, dated Nov. 14, 2008, 23 pages.
Non-Final Office Action for U.S. Appl. No. 10/923,606, dated Dec. 17, 2008, 20 pages.
Non-Final Office Action for U.S. Appl. No. 10/864,290, dated Jan. 6, 2009, 23 pages.
Notice of Allowance for U.S. Appl. No. 10/864,290, dated Jun. 29, 2009, 23 pages.
Non-Final Office Action for U.S. Appl. No. 10/923,606, dated Aug. 3, 2009, 31 pages.
Final Office Action for U.S. Appl. No. 11/001,630, dated Aug. 5, 2009, 21 pages.
Non-Final Office Action for U.S. Appl. No. 11/001,630, dated Jan. 21, 2010, 26 pages.
Non-Final Office Action for U.S. Appl. No. 11/415,361, dated Mar. 3, 2010, 52 pages.
Final Office Action for U.S. Appl. No. 10/923,606, dated Apr. 1, 2010, 36 pages.
Final Office Action for U.S. Appl. No. 11/001,630, dated Jul. 9, 2010, 22 pages.
Non-Final Office Action for U.S. Appl. No. 11/847,258, dated Oct. 18, 2010, 22 pages.
Final Office Action for U.S. Appl. No. 11/415,361, dated Oct. 21, 2010, 36 pages.

(56) References Cited

OTHER PUBLICATIONS

Non-Final Office Action for U.S. Appl. No. 11/001,630, dated Jan. 3, 2011, 23 pages.
Non-Final Office Action for U.S. Appl. No. 12/566,468, dated Mar. 4, 2011, 28 pages.
Final Office Action for U.S. Appl. No. 11/847,258, dated Apr. 14, 2011, 23 pages.
Notice of Allowance for U.S. Appl. No. 11/001,630, dated Sep. 27, 2011, 14 pages.
Non-Final Office Action for U.S. Appl. No. 12/566,468, dated Oct. 12, 2011, 17 pages.
Notice of Allowance for U.S. Appl. No. 12/566,468, dated May 25, 2012, 17 pages.
Non-Final Office Action for U.S. Appl. No. 13/348,289, dated Oct. 26, 2012, 21 pages.
Non-Final Office Action for U.S. Appl. No. 11/847,258, dated Feb. 28, 2013, 18 pages.

* cited by examiner

Figure 2A

| Users | Company | Firms | System Setup |

Customize Matter - Litigation/Arbitration - Employment Discrimination

Budgeting Options ─ 210

| Allow Users to Change These Options | ⊙ No ○ Yes ─ 211 |
|---|---|
| Budget Type | ⊙ Monthly/Fiscal Year ○ Phased ─ 212 |
| Required Budget | ○ No ⊙ Yes ─ 213 Require after [ ] days ─ 214 |
| Require End of Year Accrual | ○ No ⊙ Yes ─ 215 Require [ ] days before end of fiscal year ─ 216 |

Status Reporting Options ─ 230

| Allow Users to Change These Options | ⊙ No ○ Yes ─ 231 |
|---|---|
| Require Status Reports: | ⊙ No ○ Monthly ○ Quarterly Require after [ ] days ─ 232, 233 |
| Case Assessment: | ⊙ No ○ Yes ─ 234 Require after [ ] days ─ 235 |
| Trial Assessment: | ⊙ No ○ Yes ─ 236 Require [ ] days before trial/arbitration ─ 237 |
| Display & Confirm: | ☐ Budget ─ 238 |
| | ☐ Estimates Exposure/Recovery ─ 239 |
| | ☐ Date/Phase Resolution ─ 240 |
| | Require after [ ] days ─ 241 |

Figure 2A -- Ensuring The Accurateness And Currentness Of Information Provided By
The Submitter Of An Electronic Invoice Throughout The Life Of A Matter

Figure 2B

Matter Predictions — 250

| Use | Field Name | Firm Options | Required |
|---|---|---|---|
| 251 ☑ | Co. Estimate of Costs Resulting from Matter | ☑ View  ☑ Edit — 252 | ☐ Co.  ☑ Firm — 253 |
| 251 ☑ | Co. Estimate of Revenue Resulting from Matter | ☑ View  ☑ Edit — 252 | ☐ Co.  ☑ Firm — 253 |
| 251 ☑ | Firm Estimate of Costs Resulting from Matter | ☑ View  ☑ Edit — 252 | ☐ Co.  ☑ Firm — 253 |
| 251 ☑ | Firm Estimate of Revenue Resulting from Matter | ☑ View  ☑ Edit — 252 | ☐ Co.  ☑ Firm — 253 |
| 251 ☑ | Estimated Timing of Resolution | ☑ View  ☑ Edit — 252 | ☐ Co.  ☑ Firm — 253 |
| 251 ☑ | Estimated Date of Resolution | ☑ View  ☑ Edit — 252 | ☐ Co.  ☑ Firm — 253 |

[ Add a Custom Field ]

Resolution & Closing Information

| Use | Field Name | Firm Options | Required |
|---|---|---|---|
| ☑ | Form of Resolution | | |
| ☑ | Timing of Resolution | | |
| ☑ | Date Resolved | | |
| 251 ☑ | Description of Resolution | ☑ View  ☐ Edit — 252 | ☐ Co.  ☐ Firm — 253 |
| 251 ☑ | Lessons Learned | ☑ View  ☐ Edit — 252 | ☐ Co.  ☐ Firm — 253 |
| ☑ | Amount of Revenue Resulting from Matter | | |
| ☑ | Amount of Cost Resulting from Matter | | |
| ☑ | Number of Days to Post Final Invoice | | |

[ Add a Custom Field ]

Figure 2B – Ensuring The Accurateness And Currentness Of Information Provided By The Submitter Of An Electronic Invoice Throughout The Life Of A Matter Figure 3 – Ensuring The Accurateness And Currentness Of Information Provided By The Submitter Of An Electronic Invoice Throughout The Life Of A Matter

Figure 3:
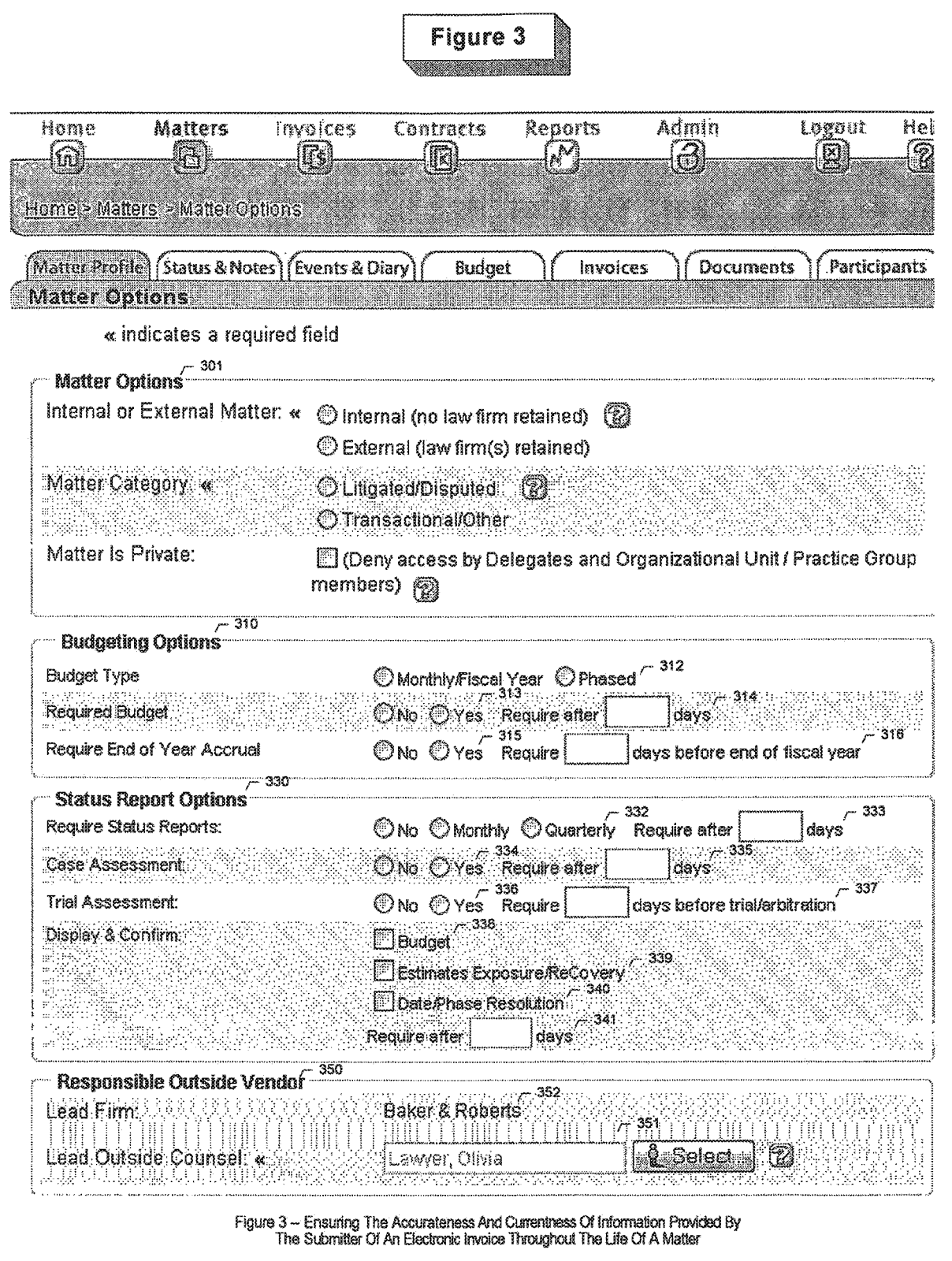

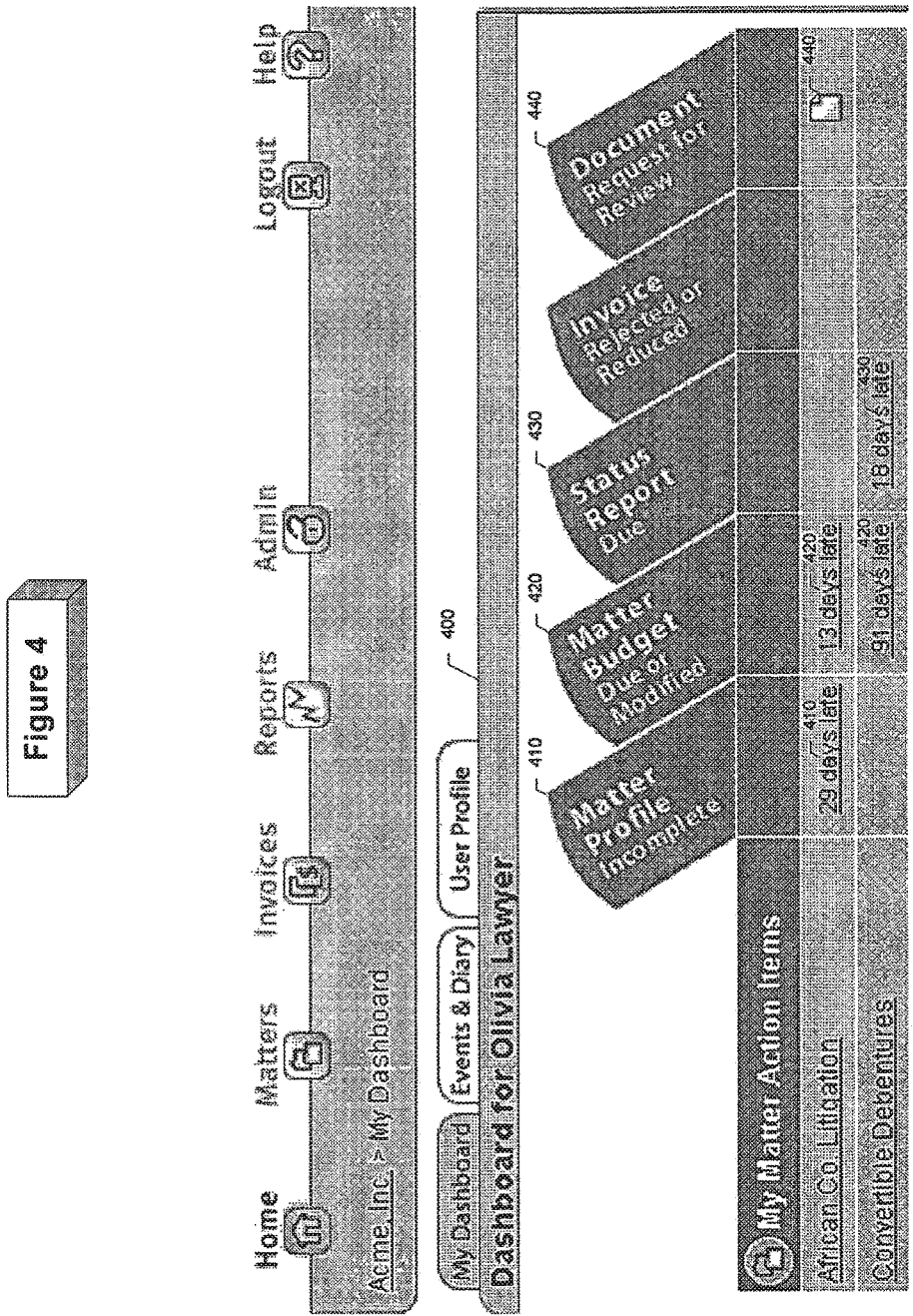
Figure 4 – Ensuring The Accurateness And Currentness Of Information Provided By The Submitter Of An Electronic Invoice Throughout The Life Of A Matter

Figure 5

| Matter Category 506 | Matter Type 507 | Lead Adverse Firm 508 | Lead Adverse Attorney 509 | Country 510 | State 511 | Key Issues 512 | Notes / Miscellaneous 513 | Estimated Date of Resolution 514 |
|---|---|---|---|---|---|---|---|---|
| 501 Litigation | Employment | 11 | 11 | 11 | 11 | 11 | 10 | 11 |
| 502 Litigation | Securities | 11 | 11 | 00 | 11 | 11 | 10 | 11 |
| 503 Litigation | Real Estate | 11 | 11 | 00 | 11 | 11 | 10 | 11 |
| 504 Transactions | Mergers | 00 | 00 | 11 | 11 | 11 | 10 | 11 |
| 505 Transactions | Real Estate | 00 | 00 | 00 | 11 | 11 | 10 | 11 |

Figure 5 – Ensuring The Accurateness And Currentness Of Information Provided By The Submitter Of An Electronic Invoice Throughout The Life Of A Matter

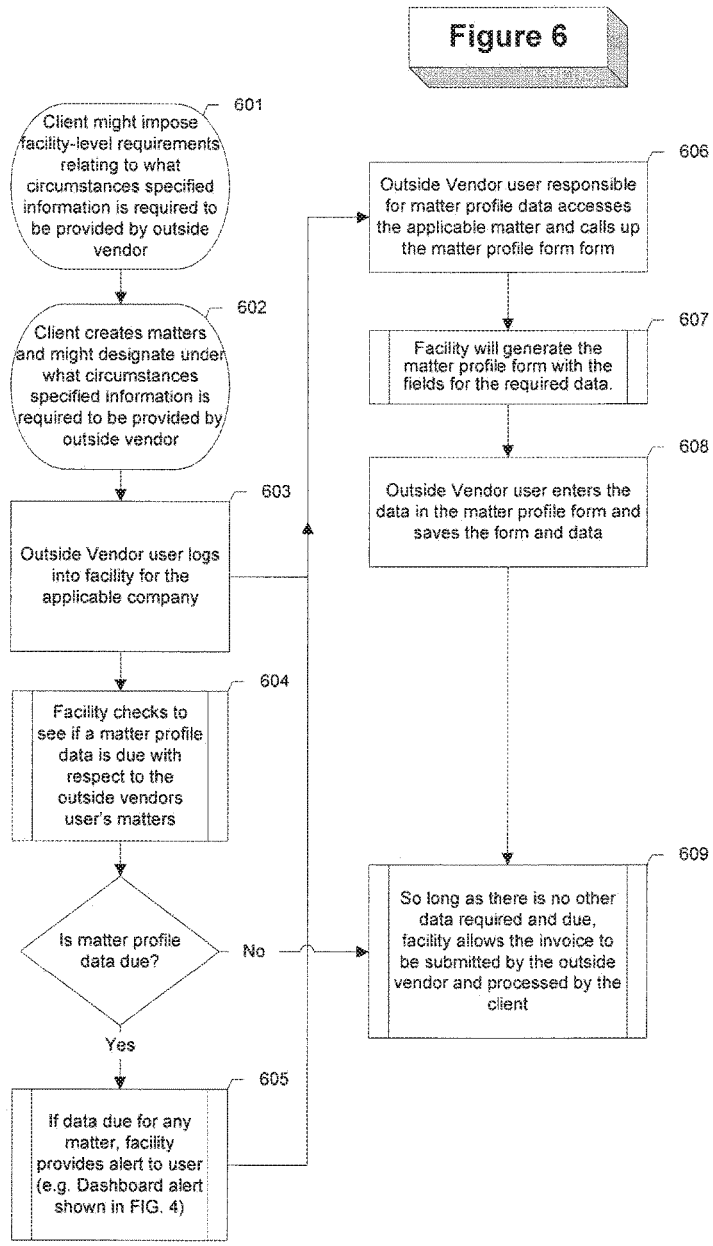
Figure 6 -- Ensuring The Accurateness And Currentness Of Information Provided By The Submitter Of An Electronic Invoice Throughout The Life Of A Matter

Figure 7

| Matter Profile | Status & Notes | Events & Diary | Budget | Invoices | Documents | Participants |

Edit Matter Profile

« indicates a required field

Information Provided By Company

Full Matter Name/Parties Involved: Vulcan Enterprises

Short Name: Vulcan Enterprises

Lead Company Person: Schumacher, Michael

Firm Information

Lead Firm: Baker & Roberts

Lead Outside Counsel: « [Lawyer, Olivia] [Select] — 701

Client Number (law firm billing #): [ ] — 706

Matter Number (law firm billing #): [ ] — 707

Matter Information

Lead Adverse Firm: [ ] — 708

Lead Adverse Attorney: [ ] — 709

Country: « [United States ▼] — 702

State: « [ ▼] — 703

Key Issues: « [ ] — 704

Notes/Miscellaneous: [ ] — 710

Matter Predictions

Firm Estimate of Costs Resulting from Matter: $[ ] — 711

Firm Estimate of Revenue Resulting from Matter: $[ ] — 712

Estimated Date of Resolution: « [ ] — 705

Figure 7 -- Ensuring The Accurateness And Currentness Of Information Provided By The Submitter Of An Electronic Invoice Throughout The Life Of A Matter

Figure 8

| Matter Object ID 806 | Name 807 | Budget Required 808 | Budget Type 809 | Date Matter Created 810 | Due After Days 811 |
|---|---|---|---|---|---|
| 1000 | Acme vs. Shriber | Yes | Monthly/FY | 4/3/2004 | 60 |
| 2000 | Acme vs. Peabody | No | Phased | 2/1/2004 | -- |
| 3000 | Acme vs. Duff | No | Monthly/FY | 3/15/2004 | -- |
| 4000 | Brown Bear v. Acme | Yes | Phased | 4/1/2004 | 90 |
| 5000 | Big E. Rentals | Yes | Phased | -- | 0 |

Figure 8 -- Ensuring The Accurateness And Currentness Of Information Provided By The Submitter Of An Electronic Invoice Throughout The Life Of A Matter

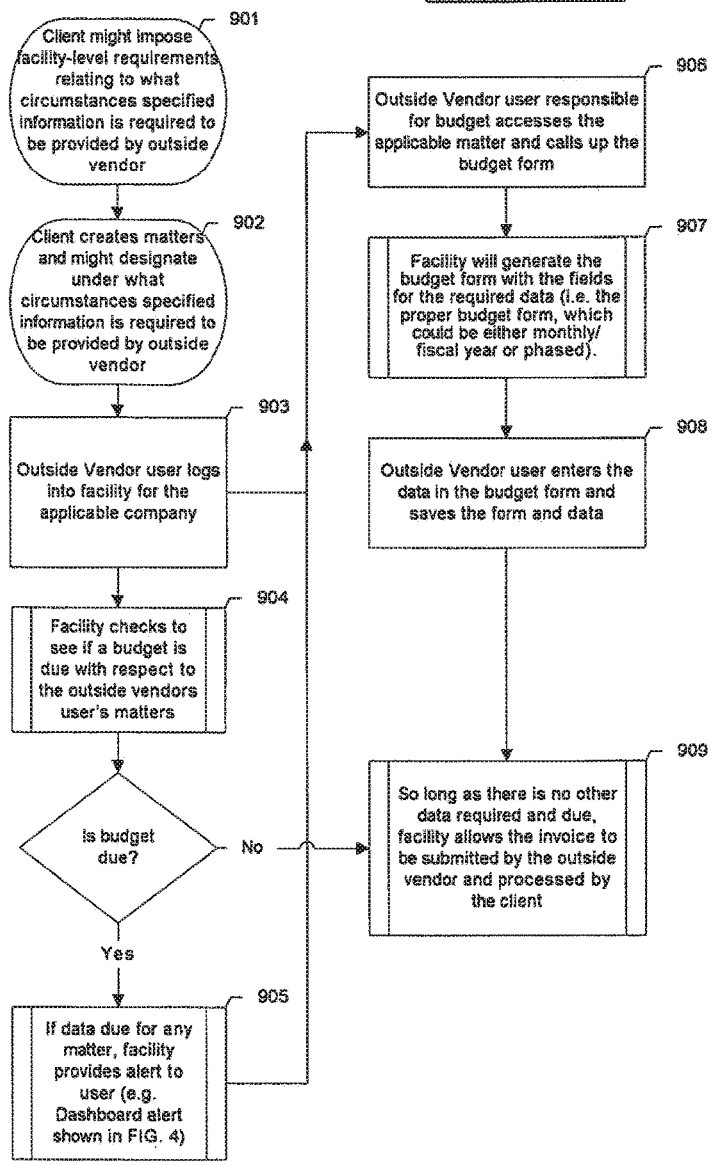
Figure 9 – Ensuring The Accurateness And Currentness Of Information Provided By The Submitter Of An Electronic Invoice Throughout The Life Of A Matter

Figure 10

Edit Budget — Matter Profile | Status & Notes | Events & Diary | Budget | Invoices | Documents | Participants — 1000

Total Budget
Estimated Total Fees and Expenses (Total Matter Budget): $ 60,000 — 1001
Amount Allocated in Budget Spreadsheet(s) below: $57,000.00
Amount not Allocated in Budget Spreadsheet(s) below: $3,000.00

Budget Spreadsheet

[Add Prior Fiscal Year] [Add Next Fiscal Year]

FY 2003 Totals — $57,000.00 — $51,000.00 — $6,000.00

| Month | Total | Fees (1001) | Expenses (1002) | Description of Budgeted Activities (1003) |
|---|---|---|---|---|
| January 2003 | $6,000.00 | $5000 | $1000 | Conduct initial research of online pharmacy laws in 50 states |
| February 2003 | $6,000.00 | $5000 | $1000 | Send out correspondence to state agencies re same |
| March 2003 | $0.00 | $0 | $0 | |
| April 2003 | $0.00 | $0 | $0 | |
| May 2003 | $0.00 | $0 | $0 | |
| June 2003 | $3,500.00 | $3000 | $500 | Gather responses from state agencies |
| July 2003 | $12,000.00 | $11000 | $1000 | Begin preparing final chart and analysis of minimum requirements |
| August 2003 | $10,000.00 | $9000 | $1000 | Finish preparing final chart and analysis of minimum requirements |
| September 2003 | $10,000.00 | $9000 | $1000 | Analyze beta pharmacy website for compliance with 50 state laws |
| October 2003 | $9,500.00 | $9000 | $500 | Prepare legal opinion regarding compliance |
| November 2003 | $0.00 | $0 | $0 | Project completed |
| December 2003 | $0.00 | $0 | $0 | Project completed |

Figure 10 – Ensuring The Accurateness And Currentness Of Information Provided By The Submitter Of An Electronic Invoice Throughout The Life Of A Matter

Figure 11

| Matter Object ID 1106 | Name 1107 | Status Reports Option | Budget Type 1109 | Case Assessment Due 1110 | Trial Assessment Due 1111 | Display Options 1112 | Display Options Due | Date of Last Status 1114 Report | Date 1115 Matter Created |
|---|---|---|---|---|---|---|---|---|---|
| 1000 | Acme vs. Shriber | Never | Monthly/FY | 60 | -1 | 000 | -1 | 4/3/2004 | 4/3/2004 |
| 2000 | Acme vs. Peabody | Monthly | Phased | -1 | 60 | 101 | 60 | 2/1/2004 | 2/1/2004 |
| 3000 | Acme vs. Duff | Quarterly | Monthly/FY | 0 | 90 | 011 | 90 | 3/15/2004 | 3/15/2004 |
| 4000 | Brown Bear v. Acme | Monthly | Phased | 90 | 60 | 111 | 30 | 4/1/2004 | 4/1/2004 |
| 5000 | Big E. Rentals | Quarterly | Phased | 60 | 30 | 100 | 60 | -- | -- |

Figure 11 -- Ensuring The Accurateness And Currentness Of Information Provided By The Submitter Of An Electronic Invoice Throughout The Life Of A Matter

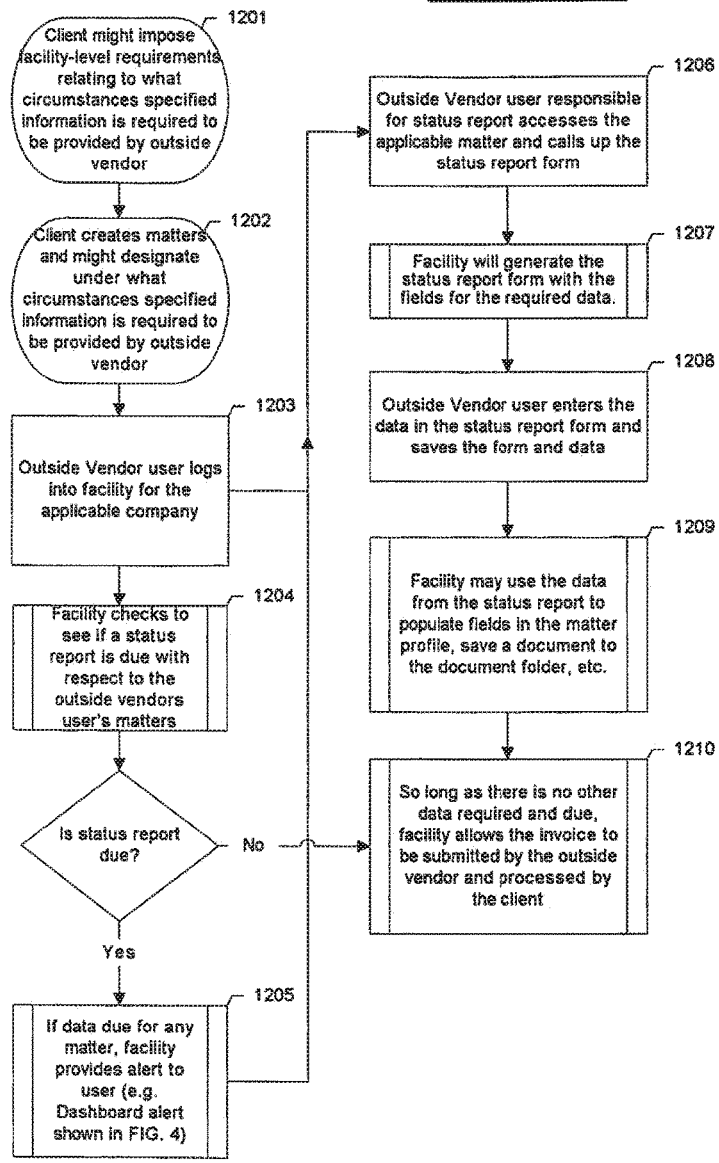
Figure 12 – Ensuring The Accurateness And Currentness Of Information Provided By The Submitter Of An Electronic Invoice Throughout The Life Of A Matter

Figure 13A

Prior Status Report - Lawyer, Greg 05/01/2004
Opposing counsel indicated on 11-20-2001 they are amending the complaint to allege fraud and seek punitive damages.

Current Status Report - Lawyer, Greg 06/01/2004
☐ No change from prior status report Matter Status:

Have there been any developments that materially affect the fees, expenses, duration or outcome of this matter?
○ Yes ● No

Budget Spreadsheet
Estimated Total Fees and Expenses (Total Matter Budget): $ _____

| | FY 2004 Totals | $0.00 | $0.00 | $0.00 |
|---|---|---|---|---|
| Month | Total | Fees | Expenses | Description of Budgeted Activities |
| June 2004 | -- | $ | $ | |
| July 2004 | -- | $ | $ | |
| August 2004 | -- | $ | $ | |
| September 2004 | -- | $ | $ | |
| October 2004 | -- | $ | $ | |
| November 2004 | -- | $ | $ | |
| December 2004 | -- | $ | $ | |

Figure 13A -- Ensuring The Accurateness And Currentness Of Information Provided By The Submitter Of An Electronic Invoice Throughout The Life Of A Matter

Figure 13B

Prior Status Report - Lawyer, Greg 05/01/2004 — 1350
Opposing counsel indicated on 11-20-2001 they are amending the complaint to allege fraud and seek punitive damages.

Current Status Report - Lawyer, Greg 06/01/2004
☐ No change from prior status report — 1351

Matter Status: — 1351

Matter Estimates

| | | |
|---|---|---|
| Estimate of Exposure: « | $ | 75,000.00 | — 1360
| Estimate of Maximum Potential Exposure: « | $ | | — 1361
| Estimate of Recovery: « | $ | 2,500.00 | — 1362
| Estimate of Maximum Potential Recovery: « | $ | | — 1363
| Estimated Timing of Resolution: « | [dropdown] | | — 1370
| Estimated Date of Resolution: « | | | — 1371
| Case Analysis: | [Browse] | | — 1380

Current Budget

Is the budget below still accurate? — 1390
○ Yes  ○ No [if no - click here to edit budget] — 1391

| Fiscal Year 2004 Budget (01/04 to 12/04) | Total | Fees | Expenses |
|---|---|---|---|
| FY 2004 Budget | $990 | $450 | $540 |
| FY 2004 Budget to Date | $990 | $450 | $540 |
| FY 2004 Actual Billings | $278 | $264 | $14 |
| % Actual vs. Budget (FY 2004 to Date) | 28% | 59% | 3% |

| Total Matter Budget (11/01 to 06/04) | | | |
|---|---|---|---|
| Total Matter Budget | $200,000 | | |
| Total Matter Budget to Date | $92,265 | $76,850 | $15,415 |
| Total Actual Billings | $14,325 | $11,711 | $2,615 |
| % Actual vs. Budget (Total to Date) | 16% | 15% | 17% |

Figure 13B – Ensuring The Accurateness And Currentness Of Information Provided By The Submitter Of An Electronic Invoice Throughout The Life Of A Matter

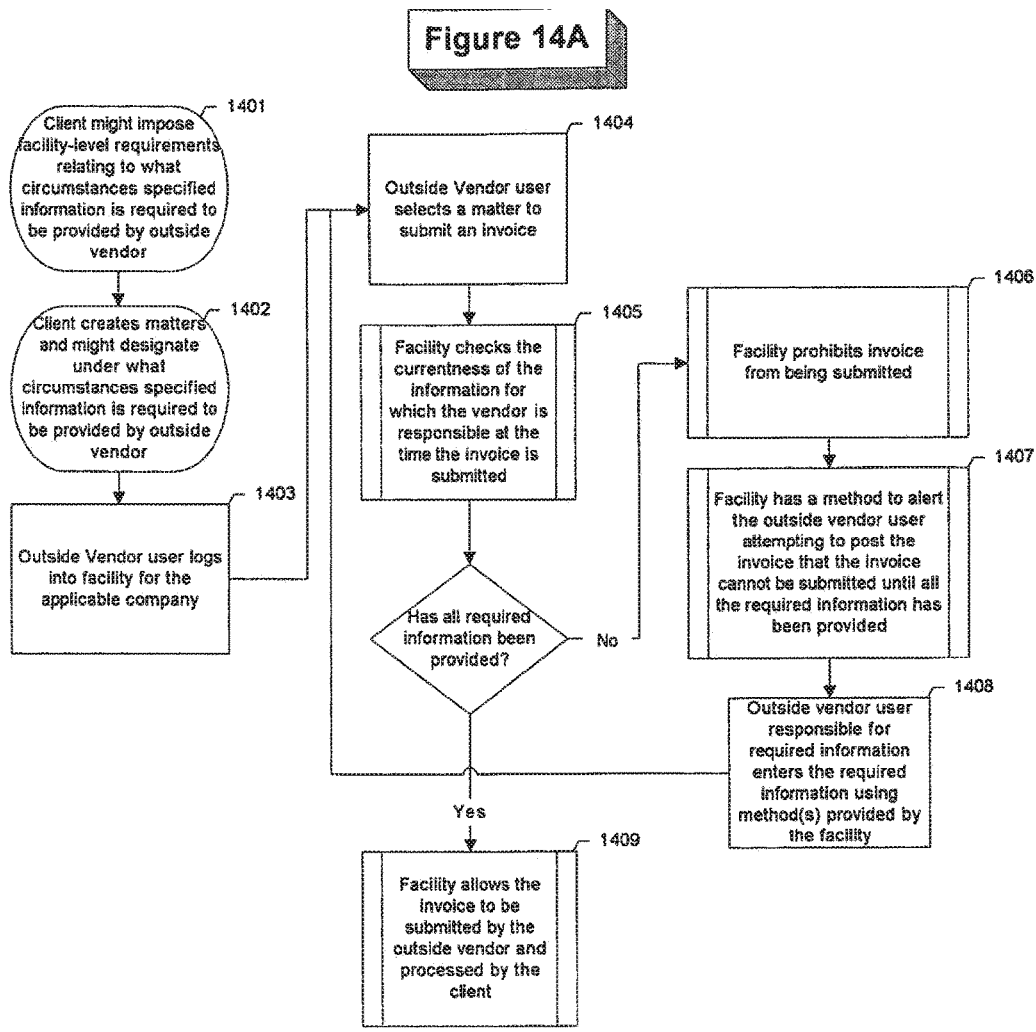
Figure 14A -- Ensuring The Accurateness And Currentness Of Information Provided By The Submitter Of An Electronic Invoice Throughout The Life Of A Matter

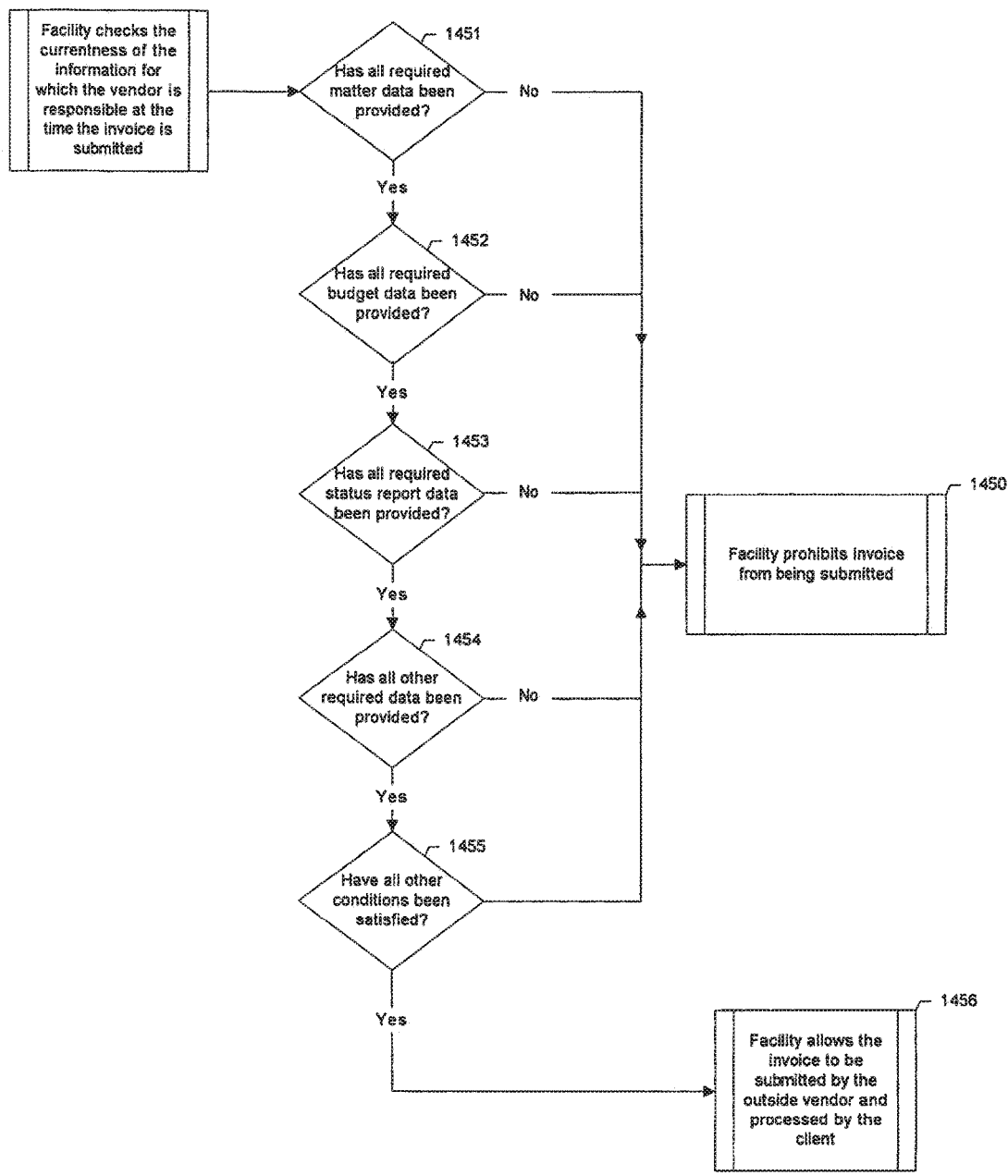
Figure 14B – Ensuring The Accurateness And Currentness Of Information Provided By The Submitter Of An Electronic Invoice Throughout The Life Of A Matter

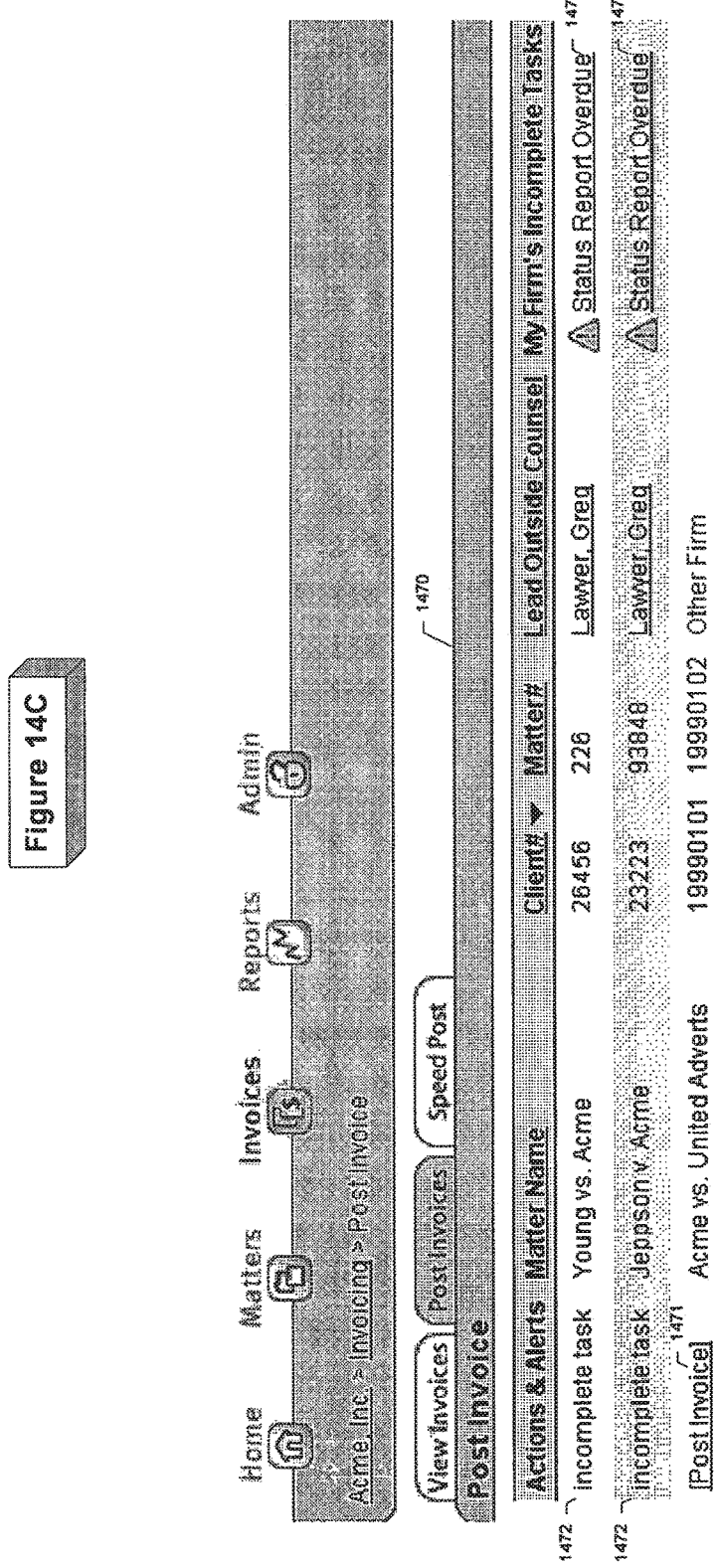
Figure 14C – Ensuring The Accurateness And Currentness Of Information Provided By
The Submitter Of An Electronic Invoice Throughout The Life Of A Matter

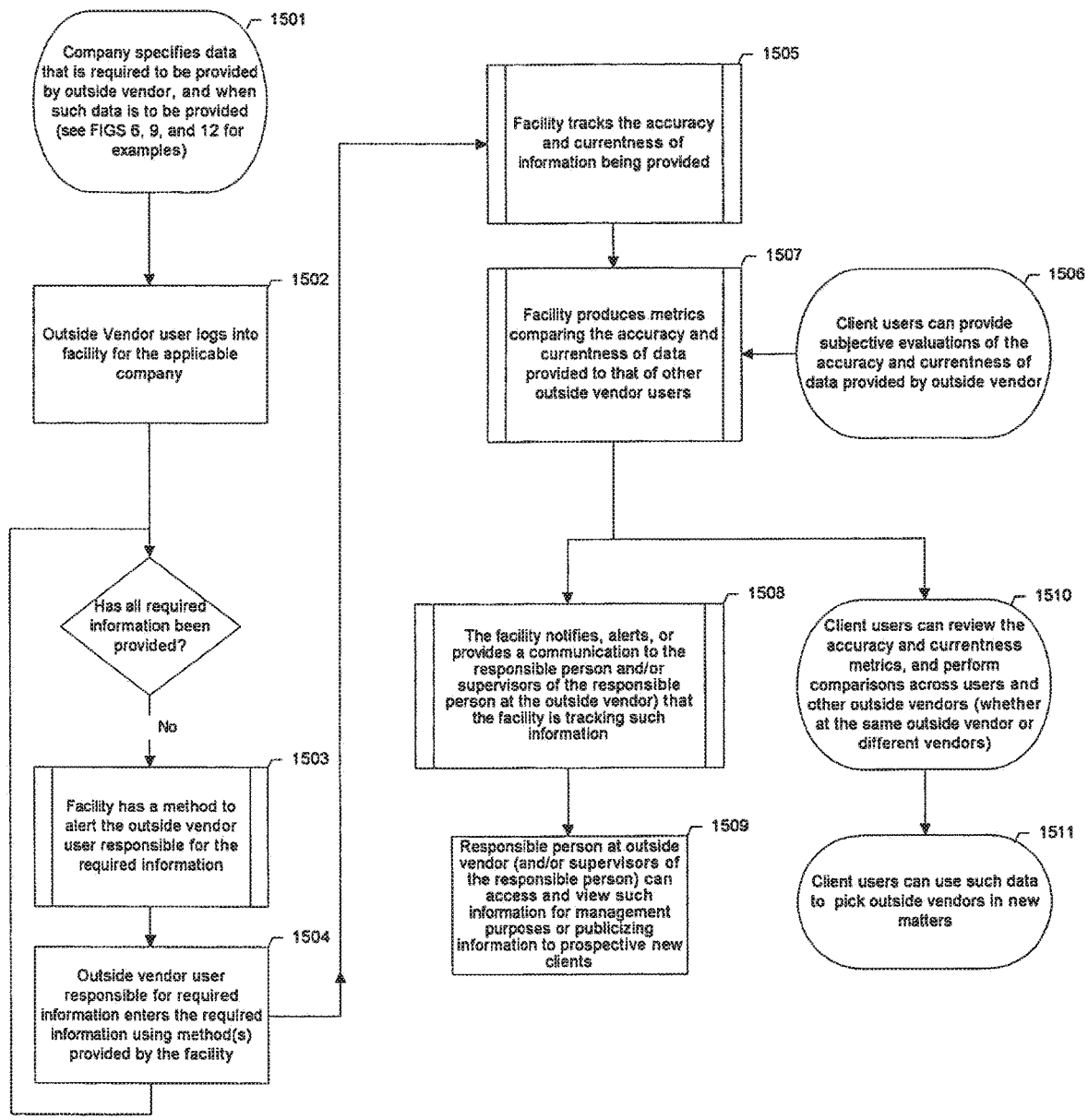
Figure 15 – Ensuring The Accurateness And Currentness Of Information Provided By The Submitter Of An Electronic Invoice Throughout The Life Of A Matter

Figure 16

| Matter Object ID 1606 | Matter Name 1607 | Vendor User ID 1608 | Outside Vendor ID 1609 | Date of Modification 1610 | Estimate of Exposure 1611 |
|---|---|---|---|---|---|
| 1000 | Acme vs. Shriber | 34353 | 103948 | 1/1/2004 | $100,000 |
| 1000 | Acme vs. Shriber | 34395 | 103948 | 2/4/2004 | $200,000 |
| 1000 | Acme vs. Shriber | 84583 | 103948 | 3/6/2004 | $250,000 |
| 1000 | Acme vs. Shriber | 34395 | 103948 | 4/6/2004 | $300,000 |
| 1000 | Acme vs. Shriber | 99999999 | --- | 4/8/2004 | $275,000 |

1601
1602
1603
1604
1605

1600

Figure 16 – Ensuring The Accurateness And Currentness Of Information Provided By The Submitter Of An Electronic Invoice Throughout The Life Of A Matter

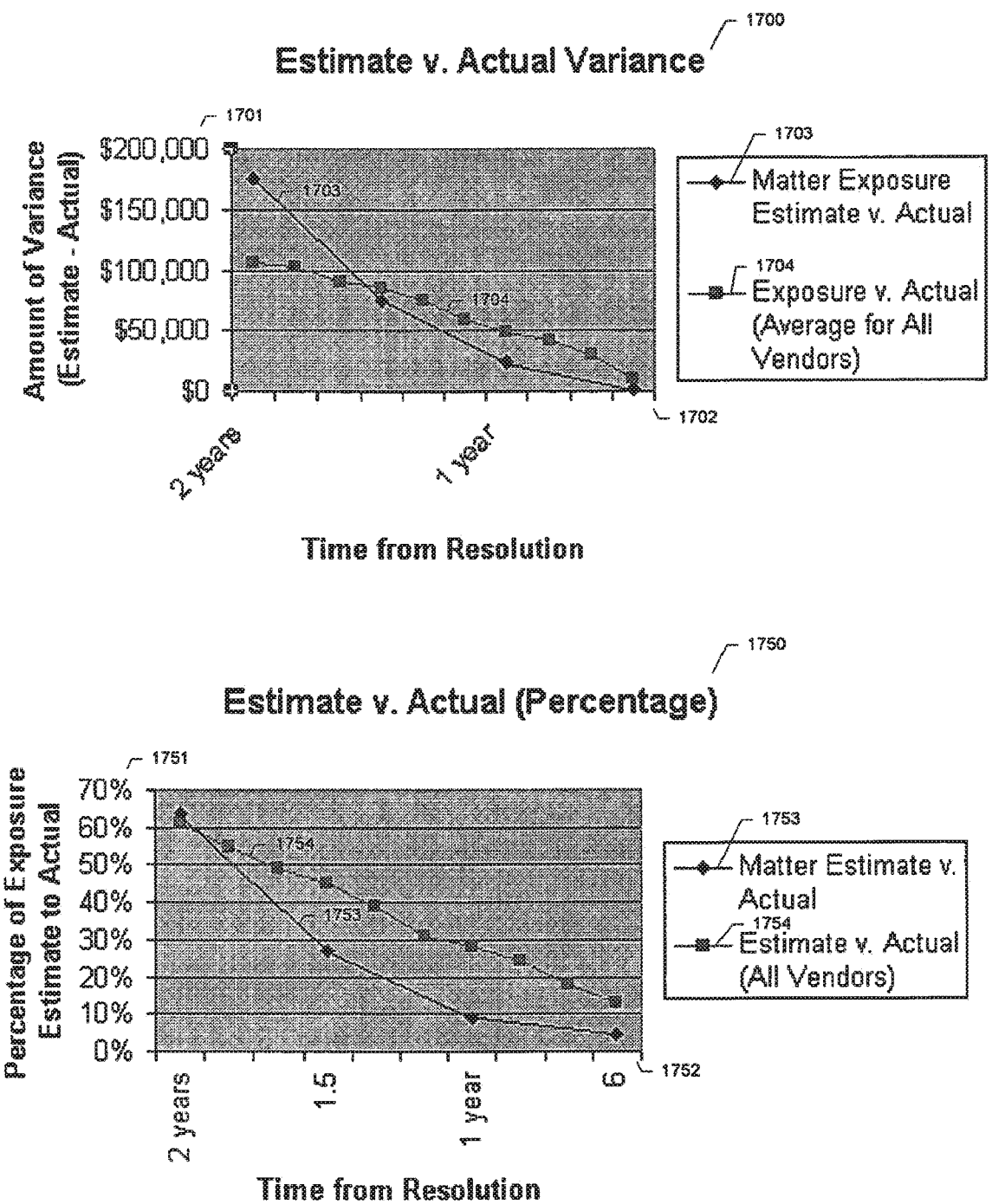
Figure 17 – Ensuring The Accurateness And Currentness Of Information Provided By The Submitter Of An Electronic Invoice Throughout The Life Of A Matter

Figure 18

*« indicates a required field*

Evaluation Date: «   05/23/2004

Firm:   Shriber & Handy  ␣1802
Attorney: «   Lawyer, Peter   ␣1803   [Select]

|  | Unacceptable<br>1 ␣1804 | Mediocre<br>2 ␣1804 | Good<br>3 ␣1804 | Very Good<br>4 ␣1804 | Excellent<br>5 ␣1804 |
|---|---|---|---|---|---|
| Understood Client's Goals: «<br>*e.g., business and legal objectives* | ○ | ○ | ○ | ○ | ◉ |
| Expertise: «<br>*e.g., knowledge and expertise about issues, substantive law* | ○ | ○ | ○ | ○ | ○ |
| Efficiency: «<br>*e.g., staffing and time spent, overall fees* | ○ | ○ | ○ | ○ | ○ |
| Responsiveness: «<br>*e.g., to deadlines, client policies, communication* | ○ | ○ | ○ | ○ | ○ |
| Predictive Accuracy: «␣1801<br>*e.g., reasonableness of budget and predicted results* | ○ | ○ | ○ | ○ | ○ |
| Effectiveness: «<br>*e.g., strategy, execution, results* | ○ | ○ | ○ | ○ | ○ |

Figure 18 – Ensuring The Accurateness And Currentness Of Information Provided By The Submitter Of An Electronic Invoice Throughout The Life Of A Matter

Figure 19

| Matter/Object ID | Matter Name 1914 | Vendor User ID 1907 | Company User ID 1908 | Company/User's Average Rating 1909 | Date of Evaluation 1910 | Expertise Rating 1910 | Efficiency Rating 1911 | Responsiveness Rating 1911 | Accuracy Rating 1912 | Effectiveness Rating 1911 | Average Rating all vendors 1913 |
|---|---|---|---|---|---|---|---|---|---|---|---|
| 1000 | Acme vs. Shriber | 34353 | 84845 | 3.3 | 4/1/2004 | 3 | 3 | 3 | 3 | 3 | 3.7 |
| 2000 | Acme vs. Peabody | 34396 | 73845 | 2.3 | 4/4/2004 | 4 | 4 | 4 | 4 | 4 | 3.7 |
| 3000 | Acme vs. Duff | 84583 | 00384 | 3.7 | 4/6/2004 | 2 | 2 | 2 | 2 | 2 | 3.8 |
| 4000 | Brown Bear v. Acme | 93834 | 73845 | 4.3 | 4/6/2004 | 5 | 5 | 5 | 5 | 5 | 3.8 |
| 5000 | Big E. Rentals | 94854 | 08384 | 3.4 | 4/8/2004 | 4 | 4 | 4 | 4 | 4 | 3.8 |

Figure 19 – Ensuring The Accurateness And Currentness Of Information Provided By The Submitter Of An Electronic Invoice Throughout The Life Of A Matter

Figure 20

| Performance Evaluation Review | | | | | | |
|---|---|---|---|---|---|---|
| Matter: | Big E Rentals | | | | | |
| Outside Counsel: | Lawyer, Sally | | | | | |
| Firm: | Shriber & Handy | | | | | |

| | Matter Review | | | Cumulative Review | | |
|---|---|---|---|---|---|---|
| Evaluation Category | Matter Rating | Deviation from Reviewer's Average | Percentile Rank | Average Ranking | Deviation from Reviewer's Average | Percentile Rank |
| Understood Goals: | 4.0 | 0.0 | 50th | 3.8 | -3.8 | 46th |
| Expertise: | 4.0 | +0.3 | 71st | 3.9 | 0.0 | 50th |
| Efficiency: | 3.0 | -0.2 | 92nd | 3.7 | +0.2 | 58th |
| Responsiveness: | 5.0 | +1.1 | 36th | 4.3 | +0.6 | 81st |
| Predictive Accuracy: | 3.0 | -0.5 | 55th | 3.2 | -0.5 | 37th |
| Effectiveness: | 4.0 | +0.1 | 48th | 3.4 | -0.3 | 42nd |
| Totals: | 3.8 | +0.8 | 65th | 3.7 | -0.1 | 48th |

| Comments: | Sally did a better job responding to our research requests; predictive accuracy was disappointing, but the case involved unusual facts. |
|---|---|
| Recommendation: | Would you recommend this attorney for similar work in the future? Yes |

Figure 20 -- Ensuring The Accurateness And Currentness Of Information Provided By The Submitter Of An Electronic Invoice Throughout The Life Of A Matter

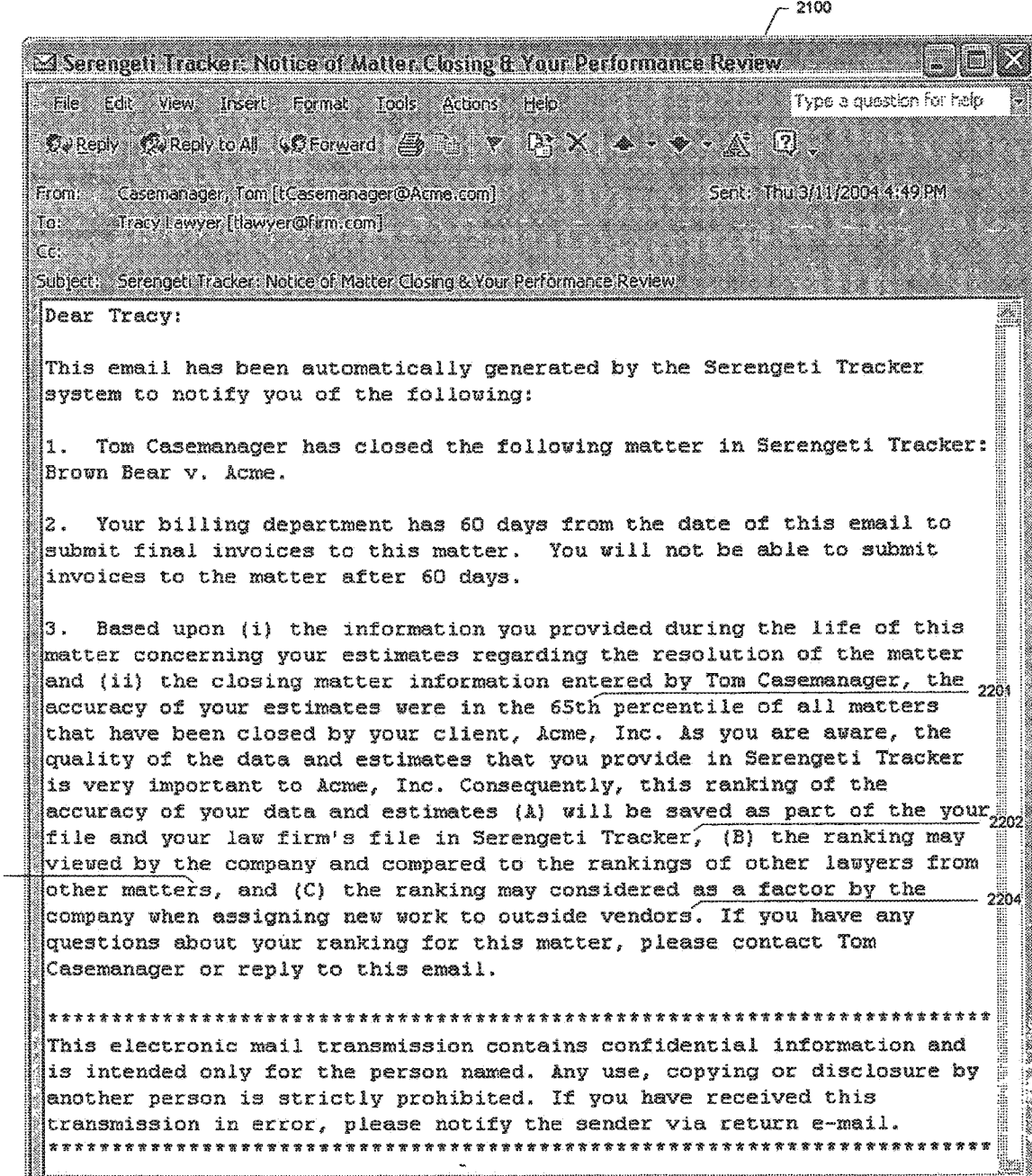
Figure 21 – Ensuring The Accurateness And Currentness Of Information Provided By The Submitter Of An Electronic Invoice Throughout The Life Of A Matter

Figure 22

| Name | Email | Company | Office | Rate | Position | Rating | Accuracy | Matters |
|---|---|---|---|---|---|---|---|---|
| Harper, Greg | gs@lawnet.com | George & Walters | Dallas | $325 | Partner | 3.5 | 26% | |
| Davis, Tom | tdavis@hallaw.com | Hal Law Firms | San Francisco | $260 | Associate | 2.1 | 17% | |
| Hansen, Tim | thansen@pollard.com | Pollard & Cuthbert | Seattle | $450 | Of Counsel | 4.6 | 88% | |
| Dale, Kim | kdale@honglaw.com | Hong & Lee | Hong Kong | $200 | Of Counsel | 3.1 | 73% | |

Figure 22 – Ensuring The Accurateness And Currentness Of Information Provided By The Submitter Of An Electronic Invoice Throughout The Life Of A Matter

ENSURING THE ACCURATENESS AND CURRENTNESS OF INFORMATION PROVIDED BY THE SUBMITTER OF AN ELECTRONIC INVOICE THROUGHOUT THE LIFE OF A MATTER

CROSS-REFERENCE TO RELATED APPLICATION(S)

The present application is a continuation of U.S. patent application Ser. No. 13/632,760 filed Oct. 1, 2012, which is a division of U.S. patent application Ser. No. 12/566,468 filed Sep. 24, 2009, now U.S. Pat. No. 8,280,812, which is a continuation of U.S. patent application Ser. No. 10/864,290 filed Jun. 9, 2004, now U.S. Pat. No. 7,617,154, which claims the benefit of U.S. Provisional Application No. 60/477,425 filed on Jun. 9, 2003, U.S. Provisional Application No. 60/497,247 filed on Aug. 22, 2003, and U.S. Provisional Application No. 60/497,246 filed on Aug. 22, 2003, each of which is hereby incorporated by reference in its entirety.

TECHNICAL FIELD

The present invention is directed to the field of automated tools for managing vendors, such as law firms.

BACKGROUND

Corporate law departments and claims departments of insurance companies (collectively, "companies" or "clients") have used matter management systems to track information about legal matters and projects (collectively, "matters"). One of the major weaknesses of these systems is that the information stored in these systems can be initially inaccurate, partially incomplete, and/or not kept updated and current. Unless the important matter data for a company's matters is accurate and kept current, reports based on this matter data are unreliable.

There are many reasons why the data is not accurately provided or kept current during the life of a matter. One reason is that although the data about the matter already exists, it has to be reentered into the system. For example, if a law firm manages a matter for a company, the law firm will have information about the current status of the matter. If the law firm does not have access to a company's matter management system, however, the law firm must first send a status report to the company in the mail or via electronic mail, and then the company has to reenter the data into the company's matter management system. Because of heavy workloads and the need to reduce expenses by minimizing employees, companies frequently never reenter the data into the matter management system, causing the system to have incomplete and missing data.

Second, some outside vendors may not appreciate the importance and detrimental consequences to a company if its matter management system does not have accurate and current data. Consequently, outside vendors (i) fail to provide data that the company has specifically requested to track in its matter management system and/or (ii) do not take the time to provide accurate data to the company and update such data when necessary. If a matter management system makes the outside vendor directly responsible for providing the data and provides feedback to the outside vendor responsible user about the accuracy of the information, or provides a method to prompt the outside vendor to review the information, the outside vendor responsible users are more likely to provide accurate information and keep such information current.

Third, if a company has not received data from an outside vendor managing a matter that the company would like to maintain in the company's matter management system, many companies do not have the time or willingness to repeatedly follow up with the firm to provide such data. For example, some companies desire that the law firm representing the company in a litigated matter provide a detailed case analysis and assessment 30-60 days after the case has been initiated. Informal surveys of such companies, however, reveal that in many situations the company never receives such an assessment from its law firm handling the case.

Fourth, many matter management systems have a set of fields that must be completed to create a matter on the system, but some types of data are not immediately available, and may not be known or reasonably provided until weeks or even months after the matter has commenced. An example of this type of information includes an estimate of exposure in a litigated matter, because the person providing the information has not had a reasonable opportunity to investigate the facts or the law affecting the litigation. Consequently, if a single form is used to input all of the information about a matter at the inception of the matter, users will frequently put in inaccurate or "dummy" information with respect to information that cannot be reasonably known or provided until weeks or months later. If a user forgets to update the inaccurate or "dummy" data, and the system does not prompt the user to review and/or update the data, the data will never be corrected in the system.

Finally, some of the information about the matter may change during the life of the matter. Frequently, however, users will forget or fail to update such information, and therefore the information does not remain current and accurate.

Corporate law departments and claims departments of insurance companies also try to use the data in matter management systems to develop metrics to analyze attorney performance on legal matters. These performance metrics depend upon the accuracy of the data in the matter management system, and are important for several reasons. During the life of a matter, metrics can be used to better assess the likely performance and results achieved by an outside vendor. Also, by analyzing the metrics of resolved matters, corporate law departments and claims departments can better select the best performing outside counsel for new matters.

Many companies have tried to create metrics that compare spending by the type of legal matter (herein called "fee-based metrics"). An example of a fee-based metric is the average outside vendor fees and expenses relating to the cost of defending a breach of contract action. In theory, this benchmarking or averaging information could help identify law firms that are more expensive and less efficient at defending such breach of contract cases. However, there are several limitations and disadvantages to fee-based metrics.

The fundamental weakness of fee-based metrics is "apples-to-oranges" comparisons. In other words, because no two matters are exactly identical, efforts to compare similar matters are inherently problematic. For example, although two cases might involve an alleged breach of contract, one case may involve counterclaims for contributory negligence and the other case may revolve around the defense of waiver of a condition precedent. Furthermore, fee-based metrics are inconsistent because the fees and hourly rates of outside vendors vary by geographic region. For example, the hourly rates of a partner in a New York City law firm are significantly higher than a partner in a Portland law firm.

Some fee-based metrics attempt to use codes to make consistent comparisons between matters or tasks performed during the life of a matter. For example, the American Bar Association (ABA) has developed codes to measure fees and expenses with respect to different aspects of a matter called the "Uniform Task-Based Management System" (UTBMS Codes). The ABA describes the purpose of the UTBMS Codes as follows: "The Uniform Task-Based Management System is a budgeting and billing system designed to provide companies and law firms with meaningful cost information on legal services." One of the stated goals of the UTBMS Codes is to "[f]acilitate effective communication of the tasks and costs of litigation and any variations from the expected or the norm." However, users of the UTMBS codes have found the codes ambiguous, overlapping, and confusing. Even the ABA's description of the UTBMS Codes recognizes this problem: "It is recognized that not all litigation work will fit neatly in a particular category. Work can overlap tasks, categories may be imprecise, or time may be expended on the truly unusual. Users should categorize the work to its primary purpose. Definitions are provided for guidance. Where uncertainty envelops substantial or repeating work, it is best for client and counsel to agree in advance on the category to be used." Because the UTBMS Codes can be ambiguous, overlapping, and confusing to users, even fastidious and good-faith users may apply them inconsistently. As a result, use of the UTBMS codes may result in unreliable baselines or "norms."

While even specialized coding systems have shown to be problematic to apply, such coding systems such as the UTBMS Codes are often burdensome, and require extensive extra work by outside vendors. For example, the UTBMS specification requires "the time charges by attorney or other professional are recorded by task." Consequently, an attorney must provide a separate fee line-item in an invoice for each task, and provide both a task and activity code for such line item. Because of the extensive time that this requires, many law firms will delegate the task of splitting up time entries and assigning task and activity codes to staff. In many situations the staff will not know how to properly divide up the time, or properly specify the UTBMS Codes for each line-item. Consequently, because of the burdens of providing the coding information, it is performed by users who do not have the knowledge about the work performed to apply the codes properly, do not apply the codes with appropriate care, or do not know how to apply the codes properly.

Other types of performance metrics are also problematic. For example, some performance metrics attempt to develop a "win-loss" record in legal litigation. However, whether an outside vendor produced a win or a loss is frequently hard to quantify. For example, settling a case for its defendant for $100,000 may be a tremendous outcome (because had it gone to trial the resulting verdict may have been significantly higher), while in another case obtaining a jury award of $50,000 for its plaintiff might be a poor outcome because the outside vendor convinced the company to turn down a settlement offer payment of $200,000.

Accordingly, a software facility that overcame some or all of the aforementioned shortcomings relating to the accurateness and currentness of information in a matter management system and, in some cases, also used the more accurate and current data to create more reliable performance metrics, would have significant utility to corporate law departments, claims departments of insurance companies, and other companies managing projects.

BRIEF DESCRIPTION OF THE DRAWINGS

FIGS. 2A & 2B are display diagrams showing a typical user interface for entering the types of administrative information that may be required of an outside vendor, such as matter information, budget information, status report information, and/or spending accrual information, and when such information will be required.

FIG. 3 is a display diagram showing a setup of a new matter in which a user specifies outside vendor responsible for the matter, and if allowed by the system level setup, which budget information, status report information, and/or spending accrual information is required of the outside vendor.

FIG. 4 is a display diagram showing sample alerts to the responsible user (and his or her delegates) of the outside vendor regarding what information is due and that must be provided before an invoice can be submitted.

FIG. 5 is a sample table diagram showing how the facility determines what matter data fields are required to be completed by the outside vendor.

FIG. 6 is a flow diagram showing steps typically performed by the facility to determine the matter data fields that are required to be completed by the outside vendor.

FIG. 7 is a display diagram showing a typical web page form presented to the responsible user (and his or her delegates) of the outside vendor so that such user can provide the required matter data.

FIG. 8 is a sample table diagram showing how the facility determines whether the outside vendor is responsible for providing a budget, when the budget is due, and what type of budget must be provided.

FIG. 9 is a flow diagram showing steps typically performed by the facility to determine whether the outside vendor is responsible for providing a budget, when the budget is due, and what type of budget must be provided.

FIG. 10 is a display diagram showing the web page form that might be presented to the responsible user (and his or her delegates) of the outside vendor so that such user can provide the required budget information.

FIG. 11 is a table diagram showing how the facility determines if and when a status report is due and what fields are required to be completed by the outside vendor in the status report.

FIG. 12 is a flow diagram showing steps typically performed by the facility to determine when a status report form is due and what data is required to be completed by the outside vendor in the status report form.

FIGS. 13A & 13B are display diagrams showing examples of web page forms that might be presented to the responsible user (and his or her delegates) of the outside vendor so that such user can provide the required status report data.

FIG. 14A is a flow diagram showing steps associated with the submission of an electronic invoice to a specific matter, and whether the facility allows the invoice to be posted.

FIG. 14B is a flow diagram showing examples of the checks the facility conducts to determine if information is due and therefore the facility will not allow the invoice to be posted.

FIG. 14C is a display diagram showing an example of a web page form 1470 used by an outside vendor to submit an invoice.

FIG. 15 is a flow diagram showing steps typically performed by the facility to track the accuracy and currentness of information being provided, and produce metrics of such accuracy and currentness, and provide notice about the accuracy of the information to (i) the person responsible for providing the information, (ii) that person's supervisor at the outside vendor, and (iii) company users, for the purpose of improving the awareness of the person responsible about the importance of providing accurate and current information.

FIG. 16 is a table diagram showing how the facility tracks all revisions to a specific field or type of data, such as the estimate exposure or resolution amount for a litigated matter, which can then be used to produce metrics.

FIG. 17 is a display diagram showing how the facility can use the data in FIG. 16 to produce a graph or chart of accurateness of the information provided by the outside counsel.

FIG. 18 is a display diagram showing a web page form that a company user fills out to provide a subjective evaluation of the accurateness and currentness of the information provided by the outside vendor during the life of the matter.

FIG. 19 is a table diagram showing typical information saved by the facility about the subjective evaluation completed in FIG. 18 to enable the facility to generate metrics about the outside vendor performance.

FIG. 20 is a display diagram showing an example of the types of metrics that can be generated and displayed using the subjective evaluation data.

FIG. 21 is a display diagram of an email messaging that the facility sends to the outside vendor notifying the responsible person and/or his or her supervisor of the responsible person's metrics with respect to the matter.

FIG. 22 is a display diagram showing a list of potential persons at one or more outside vendors with each of the potential person's accuracy metrics displayed, which can be used by the company user to select an outside vendor to represent the company on a new matter.

DETAILED DESCRIPTION

Figure 1:
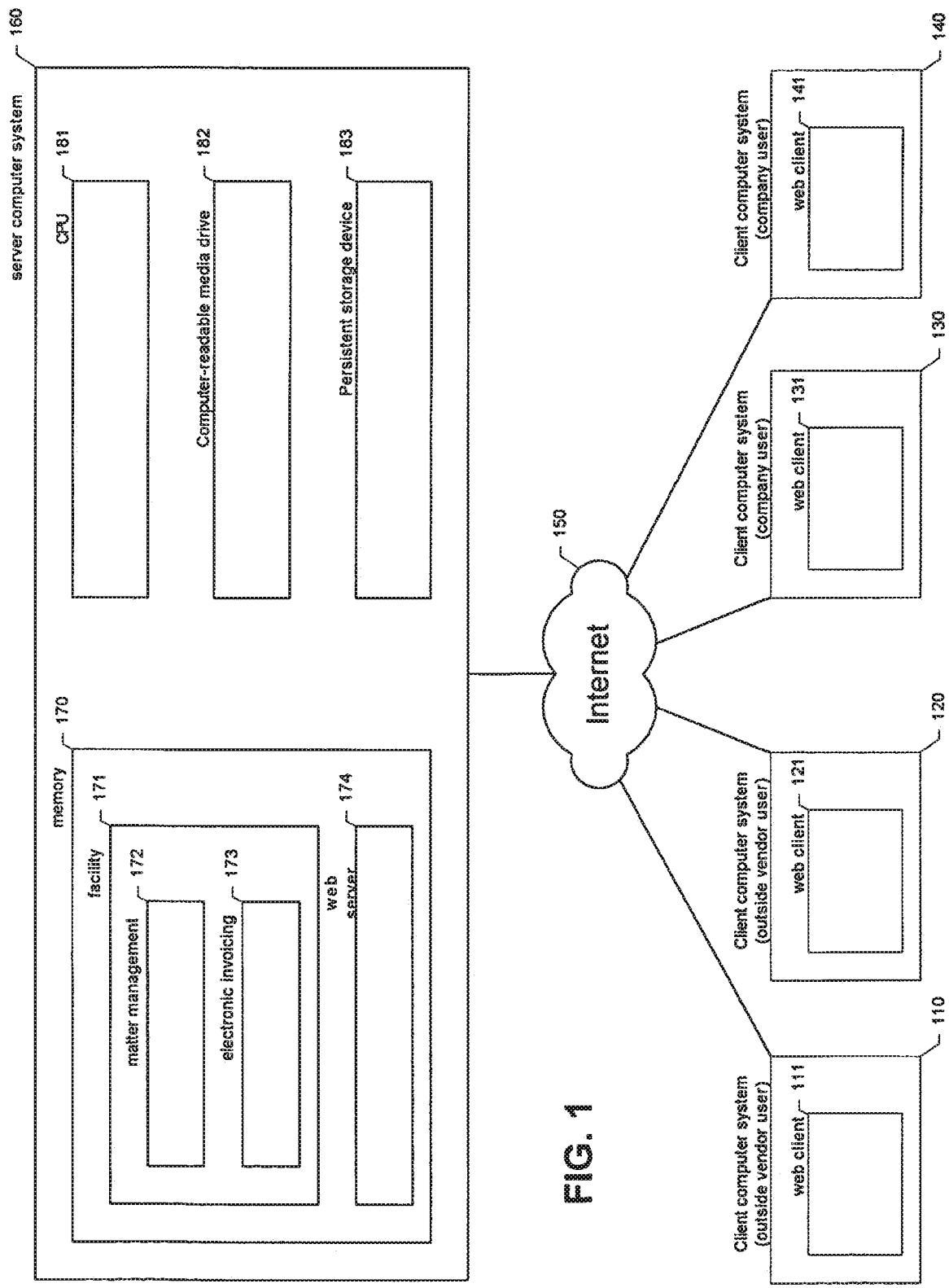
FIG. 1 is a high-level block diagram showing a typical environment in which the facility operates.

A software facility for ensuring the accurateness and currentness of information provided by the submitter of an electronic invoice throughout the life of a matter and for generating metrics about the accuracy and currentness of such information (the "facility") is described. In some embodiments, both company users (such as corporate law department users or insurance claims department users) and outside vendors (such as law firms, consulting firms, or other submitters of invoices) can access the facility. Outside vendors are made responsible for using the facility to input matter information that is directly relevant to their work on the matter. For example, outside vendor law firm users are responsible for (a) filling out information about the matter such as relevant country and state, (b) providing a document or information that characterizes the present status of the matter, referred to herein as a "status report," and (c) providing a budget for the matter. In other words, by operating the matter management facility on a shared network, the facility captures information at the most logical source by requiring the outside vendors to enter their information into the facility rather than sending the information to the company users and requiring the company users to reenter the information into the facility. In some embodiments, the outside vendor submits invoices electronically through the matter management facility.

In some embodiments, the facility conditions the outside vendor's ability to submit an invoice on the currentness of the information for which the outside vendor is responsible. In some embodiments, the facility notifies the outside vendor that certain required information is due or must be updated. Thus, even though the invoice submittal process and the information for which the outside vendor is responsible are unrelated, the facility uses the invoicing process (in other words, the strong desire of the outside vendor to get paid) as leverage to ensure that the outside vendor has provided information for which it is responsible.

In some embodiments, the facility uses dynamic forms to require that users review or update data temporally. The facility is configurable so that the company can specify when during the life of the matter certain information is required to be provided by the outside vendor. This configurability could be at the facility-level, across all of a company's matters, and/or on a matter-by-matter basis. In some embodiments, the facility notifies the outside vendor that certain required information is due or must be confirmed to be accurate. In these embodiments, the matter management facility also conditions the outside vendor's ability to submit an invoice on the currentness of the information for which the outside vendor is responsible at the time of the invoice submission.

In certain embodiments, the facility creates incentives for outside vendor users who are designated as the "responsible person" for a specific matter to provide accurate and current information about the matter. The facility creates these incentives by, for example, (i) heightening the awareness of responsible persons of the importance of the accuracy and currentness of the information for each matter, (ii) enabling company users to be able to assign new work to responsible persons at outside vendors based on which responsible persons have been the most responsive and reliable providing accurate and current information, and (iii) communicating to responsible persons that companies may assign new work based on the responsible person's historic performance with respect to providing accurate and current information, especially as compared to responsible persons at other outside vendors.

In order to create these incentives for responsible persons at outside vendors, the facility, in some embodiments: (1) clearly identifies the responsible person at the outside vendor who has ultimate responsibility for the accuracy and currentness of information for a particular matter; (2) provides a means to provide information in the matter and to require that the data be reviewed an updated throughout the life of the matter; (3) tracks and analyzes the accuracy and currentness information being provided for the matter; (4) compares the accuracy and currentness of information provided by outside vendors for a company (or across all outside vendors for all companies using the facility); (5) allows company users to access and analyze the data when selecting responsible persons and outside vendors for new work; and/or (6) communicates to responsible persons (and/or supervisors of the responsible persons at the outside vendor) that the facility is tracking such information, and may be used by the company as the basis for hiring responsible persons and outside vendors for new work.

Another benefit provided by embodiments of the facility is that the accuracy and currentness data about the outside vendor's prediction of results (whether spending, duration, or outcome), which can then be compared to the actual results (herein called "predictive accuracy metrics"), also provide a superior analysis of outside vendor performance than fee-based metrics. Such predictive accuracy metrics are superior because they are not dependent on the comparison of similar cases (e.g., cases of similar complexity or in similar geographic locations), and are not dependent on the consistent application of coding systems such as UTBMS codes. Instead, the predictive accuracy metrics assess the accuracy and correctness of information provided by the outside vendor against the actual results achieved by the vendor. Thus, the complexities and variables that plague fee-based metrics are not applicable to the predictive accuracy metrics. Such metrics are possible because the facility, in some embodiments, (1) combines matter management with electronic invoicing, (2) enables outside vendors to directly access the system and supply data into the system, and (3) has a means to require that the predictive accuracy of the data are reviewed and updated by the outside vendor throughout the life of the matter.

Details of how the facility may be implemented are described below in conjunction with FIGS. 1-22.

FIG. 1 is a high-level block diagram showing a typical environment in which the facility operates. The block diagram shows several shows several client computer systems (which are company users and outside vendor users), such as client computer systems 110, 120, 130, and 140. Each of the client computer systems has a web client computer program for browsing the World Wide Web, such as web clients 111, 121, 131, and 141. The client computer systems are connected via the Internet 150 to a server computer system 160 hosting the facility. Those skilled in the art will recognize that client computer systems could be connected to the server computer system by networks other than the Internet, however. To be able to connect to the server computer system, the client computer systems must properly authenticate itself to the server computer system, such as by providing user ID and password, or using other authentication technology.

The server computer system 160 contains a memory 170. The memory 170 preferably contains the facility 171, incorporating both matter management functionality 172 and electronic invoicing functionality 173 typically used by the facility. The memory preferably further contains a web server computer program for delivering web pages in response to requests from web clients. While items 171-174 are preferably stored in memory while being used, those skilled in the art will appreciate that these items, or portions of them, may be transferred between memory and a persistent storage device 183 for purposes of performing memory management and maintaining data integrity. The server computer system further contains one or more central processing units (CPU) 181 for executing programs, such as programs 171-174, and a computer-readable media drive 182 for reading information or installing programs such as the facility from computer-readable media, such as a floppy disk, a CD-ROM, or a DVD.

While various embodiments are described in terms of the environment described above, those skilled in the art will appreciate that the facility may be implemented in a variety of other environments including a single, monolithic computer system, as well as various other combinations of computer systems or similar devices connected in various ways. Additionally, those skilled in the art will appreciate that the facility may be implemented using various software configurations, such as configurations in which the matter management and electronic invoicing software are merged, or other configurations in which their functionality is divided across a larger number of modules, and/or distributed over multiple computer systems.

FIGS. 2A & 2B are display diagrams showing a typical user interface for entering the types of administrative information that may be required of an outside vendor, such as matter information, budget information, status report information, and/or spending accrual information, and when such information will be required. This "setup" user interface, shown on web page 200, is therein titled "Customize Matter—Litigation/Arbitration—Employment Discrimination." As shown, the setup is organized into several categories of information, such as budget setup and required information 210, status report setup and required information 230, and matter field setup and required information 250.

In the budget setup section 210, the facility enables the company user to specify whether a budget is required of the outside vendor 213 and when the budget is required 214, what type of budget is required 212, and/or whether an accrual entry for outside vendor spending during the fiscal year that has not yet been billed (used by companies that use the "accrual" method of accounting) 215 and when the accrual entry is required 216.

In the status report setup section 230, the facility enables the company user to specify whether a monthly or quarterly status report is required of the outside vendor 232 and when the first status report is required 233; whether a detailed case assessment is required to be attached to a status report 234 and in which status report the detailed case assessment should be provided 235; whether a detailed trial analysis is required to be attached to a status report 236 and in which status report the detailed trial analysis should be provided 237; and/or whether the matter budget 238, estimates of exposure/recovery 239, and/or estimates of resolution are required, and if already provided displayed and confirmed 240, and when such data (i.e., 238-240) is first required to be provided/confirmed 241.

With respect to the setup of the required budget information and the status report information, in some embodiments the facility prevents these settings from being altered during the setup of the matter. Alternatively, these settings can be created as default settings that are alterable by the user creating a matter 211, 231.

In FIG. 2B in the matter setup section 250, the facility enables the company user to specify what fields the firm is required to provide to complete the setup of the matter. For example, for some fields, the company user may select whether the field will be used 251, whether the firm is responsible for editing the field 252, and whether the field is required 253.

While various embodiments are described in terms of the setup described above, those skilled in the art will appreciate that the facility may be implemented in a variety of other setup criteria and options. For example, the setup could be varied (i) for every matter classification in the facility (e.g., litigation, transactional, advice and counsel, permit/licensing matters are examples of different matter classifications) and (ii) for each subject matter type within each matter classification (e.g., environmental, employment/labor, securities, business contracts, etc. are examples of different subject matter types). In addition, the types of required information and the timing of the information could also be specified with respect to the outside vendor. For example, some information could be required of certain vendors, and other vendors would not need to provide such information. Such settings could be specified vendor-by-vendor, or by category of vendor. Also, the facility may have other configurations with respect to the types of information that is required and the timing of the required information.

FIG. 3 is a display diagram showing a typical new matter setup in which a user specifies outside vendor responsible for the matter, and if permitted by the system-level setup described in FIGS. 2A and 2B, which budget information, status report information, and/or spending accrual information is required of the outside vendor. This display diagram assumes that the administrative setup options described in FIG. 2A allows a person creating the matter to change the selections.

The matter setup page may have other selections about the matter which do not involved required fields 301. However, in the budget setup section 310, the facility enables the company user to specify whether a budget is required of the outside vendor 313 and when the budget is required 314, what type of budget is required 312, and/or whether an accrual entry for outside vendor spending during the fiscal year that has not yet been billed (used by companies that use the "accrual" method of accounting) 315 and when the accrual entry is required 316.

In the status report setup section 330, the facility enables the company user to specify whether a monthly or quarterly status report is required of the outside vendor 332 and when the first status report is required 333; whether a detailed case assessment is required to be attached to a status report 334 and in which status report the detailed case assessment should be provided 335; whether a detailed trial analysis is required to be attached to a status report 336 and in which status report the detailed trial analysis should be provided 337; and/or whether the matter budget 338, estimates of exposure/recovery 339, and/or estimates of resolution are required, and if already provided displayed and confirmed 340, and when such data (i.e., 338-340) is first required to be provided/confirmed 341.

In the Outside Vendor Responsible setup section 350, the facility enables the company user to specify the outside vendor user responsible for the matter 351 and the system automatically fills in the name of the outside vendor associated with such user 352. Those skilled in the art will appreciate that the user interface for selecting the outside vendor user responsible and the outside vendor may be implemented in a variety of other selection options. In addition, those skilled in the art will recognize that while the selections identified in FIG. 3 is on one web page, such selections may be made in a sequence of web pages.

FIG. 4 is a display diagram showing sample alerts to the responsible user (and his or her delegates) of the outside vendor regarding what information is due and that must be provided before an invoice can be submitted. In this particular embodiment, the facility presents a web page 400 to the responsible person (and any delegates of the responsible person) each time he or she logs into the facility that shows a list of all of the required information that is due. For example, an alert may show if information is due for the matter 410, a budget is due 420, a status report is due 430, or a document is due or must be reviewed 440. In certain embodiments of the facility, the alert is a hyperlink, which the user can click on to display the form with the fields to provide the required information. Other embodiments not shown in FIG. 4 might contain an alert that accrual estimates are due. While various embodiments are described in terms of the alerts described above, those skilled in the art will appreciate that the facility may provide alerts for other required data or other of methods notifying the responsible person (and any delegates of the responsible person) that required information is due. For example, other embodiments of the facility may also send an email to the responsible person at the outside vendor (and to any delegates specified by the responsible person in his or her user profile) with a description of the required information that is due.

FIG. 5 is a sample table diagram showing how the facility determines what matter data fields are required to be completed by the outside vendor. The matter data table 500 is comprised of rows, such as rows 501-505, each of which corresponds to a unique matter classification. In the particular embodiment shown in FIG. 5, the unique matter classification is a combination of the matter category 506 and the matter type 507, but those skilled in the art will appreciate that the facility may be implemented using a variety of other matter classifications. In addition to the matter category 506 and the matter type 507 columns, each row is divided into columns containing the types of fields offered by the facility. In the particular embodiment illustrated in FIG. 5, the fields include Lead Adverse Firm 508; Lead Adverse Attorney 509; Country 510; State 511, Key Issues 512, Notes/Miscellaneous 513, and Estimated Date of Resolution 514. For each data field represented by a column, the facility determines (i) if the field is to be displayed to outside vendor users (if the first digit is a "1" the field is to be displayed, but if the first digit is a "0" the field is not to be displayed) and (ii) if outside vendor is required to enter a value for the matter data field before the outside vendor may submit the invoice (if the second digit is a "1" the field is required to be completed before the outside vendor may submit an invoice, but if the second digit is a "0" the field is not required).

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 6 is a flow diagram showing steps typically performed by the facility to determine the matter data fields that are required to be completed by the outside vendor. The company first creates system-level requirements for data 601, or sets requirements for data when a matter is created 602. Then, after an outside vendor user responsible for data in one or more matters (or his or her delegates) logs into the facility 603, the facility checks to determine if the user is responsible for any matters in which data is required and due 604. This includes but is not limited to determining if matter data is due. If data is required and due for any of the user's matters, the facility provides an alert for each matter in which matter data is due (as shown in FIG. 4) 605. The user can access the matter and call up the matter data form for the matter 606, and the facility will generate the matter data form with the fields for the required data 607. The user can then enter the data in the matter data form, and save the form 608. Once the matter data has been submitted that satisfies the requirement for the data that is required and due, the outside vendor user (or another outside vendor user for the same vendor) can submit an invoice to the matter so long as no other data is required and due for the matter 609.

Those skilled in the art will appreciate that the steps shown in FIG. 6 and in each of the flow diagrams discussed below may be altered in a variety of ways. For example, the order of the steps may be rearranged; substeps may be performed in parallel; shown steps may be omitted, or other steps may be included; etc.

FIG. 7 is a display diagram showing a web page form presented to the responsible user (and his or her delegates) of the outside vendor so that such user can provide the required matter data. After the company creates the matter in the facility, the outside vendor fills out a form 700 containing the required information about the matter. At the creation of the matter, the data input form contains only those fields that are required to be immediately completed by the outside vendor 701-705. The form might also include fields that are optional for the outside vendor to complete 706-712.

FIG. 8 is a sample table diagram showing how the facility determines whether the outside vendor is responsible for providing a budget, when the budget is due, and what type of budget must be provided. The budget table 800 is comprised of rows, such as rows 801-805, each corresponding to a matter. Each row is divided into a matter ID column (which is the object ID in the facility) 806; the matter name 807; a code indicating whether the budget is required to be completed by the outside vendor 808; if a budget is to be required, the budget type 809; the date the matter was created 810; and the number of days after the matter was created that the budget is due 811. The facility can determine from the data in each row whether a budget is required of outside counsel, when the budget is due, and what type of budget must be provided. For example, for matter object ID 1000, because the matter was created on Apr. 3, 2004, and a budget is due 60 days later, the budget will be due on Jun. 2, 2004. The type of budget due for matter object ID 1000 would be a monthly/fiscal year budget.

FIG. 9 is a flow diagram showing steps typically performed by the facility to determine whether the outside vendor is responsible for providing a budget, when the budget is due, and what type of budget must be provided. The company first creates system-level requirements for data 901, or sets requirements for data when a matter is created 902. Then, after an outside vendor user responsible for data in one or more matters (or his or her delegates) logs into the facility 903, the facility checks to determine if the user is responsible for any matters in which data is required and due 904. This includes but is not limited to determining if a budget is due, and if so, which type of budget is due. If data is required and due for any of the user's matters, the facility provides an alert for each matter in which a budget is due (as shown in FIG. 4) 905. The user can access the matter and call up the budget form for the matter 906, and the facility will generate the budget form with the fields for the required data (i.e., the proper budget form, which could be either monthly/fiscal year or phased) 907. The user can then enter the data in the budget form, and save the form 908. Once the budget has been submitted that satisfies the requirement for the data that is required and due, the outside vendor user (or another outside vendor user for the same vendor) can submit an invoice to the matter so long as no other data is required and due for the matter 909.

FIG. 10 is a display diagram showing the web page form that might be presented to the responsible user (and his or her delegates) of the outside vendor so that such user can provide the required budget information. If a budget is required for a matter, the facility presents a budget input form 1000 which the outside vendor is required to complete. As shown, the budget input form is separate from the matter information input form; in some embodiments, they are part of the same form. As shown, the budget input form is separate from the status report form; in some embodiments, they are part of the same form. As shown, the outside vendor specifies the total budget for the life of the matter 1001, and the fees 1002 and expenses 1003 budgeted for each month of the current fiscal year, together with a description of the tasks for each month 1004. In other embodiments, the facility uses different budget forms, such as budget amounts for certain tasks or certain time periods.

FIG. 11 is a table diagram showing how the facility determines if and when a status report is due and what fields are required to be completed by the outside vendor in the status report. The status report table 1100 is comprised of rows, such as rows 1101-1105, each corresponding to a matter. Each row is divided into a matter ID column (which is the object ID in the facility) 1106; the matter name 1107; the status report option 1108; if a budget is to be confirmed or updated in the status report, the budget type 1109; requirement that the status report include a case assessment and when it is due in terms of the number of days after the matter was created 1110; requirement that the status report include a trial assessment and when it is due in terms of the number of days before the trial data 1111; requirements for other data 1112 and when such data is due 1113; the date of the last status report 1114; and the date the matter was created 1115. The facility can determine from the data in each row whether a status report is due at any given time and what fields should be displayed in the status report. For example, the status report options column 1108 is one check to determine if a status report is due that month. If the selection is "Quarterly," and the current day is Apr. 2, 2004, and if a status report was not submitted Apr. 1, 2004, or Apr. 2, 2004 (as shown in the date of the last status report 1114), then the status report is due (in this particular embodiment the "Quarterly" selection uses the quarters of a calendar year, but those skilled in the art will appreciate that the frequency of the reporting option or the cycle dates can vary).

Even if a status report is not required because of the status report option field, there are other reasons that a status report may be due. For example, if as shown the "Big E. Rentals" matter was created on Jan. 15, 2004, and if a case assessment is due 60 days thereafter, a status report due alert (see FIG. 4) would be generated and displayed to the outside vendor user responsible for the data (or his or her delegate) on Mar. 15, 2004, and the outside vendor would not be able to submit invoices until such status report data is provided. If an outside vendor opened up the status report form between March 15$^{th}$ and March 31, the form might include a field for the current status of the matter and a field in which the user is required to attach a document containing the case assessment prior to saving the form. If the user does not submit a status report during such time period, and opens up the status form report after March 31, the form may also require additional data (e.g., if the status report table specifies that a budget must be confirmed Quarterly).

Similarly, the facility can use the trial assessment due column 1111 to determine if a status report is due, and if the status report form should include an attachment containing the trial assessment (the facility must reference the trial date contained in a separate table in the facility, which can be cross referenced using the Matter Object ID 1106).

Similarly, the facility can use the "Display Options" column 1112 to determine (i) if the status report form displays the current budget (see FIG. 2A 238) and requires the outside vendor user to confirm or update the budget (if the first number in the three-digit sequence is a 1 the budget must be displayed and confirmed, if the digit is a 0, the budget is not displayed); (ii) if the status report form displays the current estimates of exposure/recovery (see FIG. 2A 239) and requires the outside vendor user to confirm or update the estimates of exposure/recovery (if the second number in the three-digit sequence is a 1 the estimates of exposure/recovery must be displayed and confirmed, if the digit is a 0, the estimates of exposure/recovery are not displayed); and/or (iii) if the status report form displays the resolution estimates (see FIG. 2A 240) and requires the outside vendor user to confirm or update the resolution estimates (if the first number in the three-digit sequence is a 1 the resolution estimates must be displayed and confirmed, if the digit is a 0, the resolution estimates are not displayed). In connection with the Display Option column, the facility uses the "Display Options Due" column 1113 to determine in what status report such data is shown and required to be updated (after which it will be included in all future monthly or quarterly status reports).

Those skilled in the art will recognize that the facility could be designed so that any type of data could be required to be input or updated in the status report form. Essentially, the status reporting tool can be used to ensure that any type of data in the facility is provided at a specific point in time, or periodically confirmed and/or updated throughout the life of the matter.

FIG. 12 is a flow diagram showing steps typically performed by the facility to determine when a status report form is due and what data is required to be completed by the outside vendor in the status report form. The company first creates system-level requirements for data 1201, or sets requirements for data when a matter is created 1202. Then, after an outside vendor user responsible for data in one or more matters (or his or her delegates) logs into the facility 1203, the facility checks to determine if the user is responsible for any matters in which data is required and due 1204. This includes but is not limited to determining if there is a monthly or quarterly status report due for the month, or if other data is required to be provided for that month such as a case assessment. If data is required and due for any of the user's matters, the facility provides an alert for each matter in which a status report is due (as shown in FIG. 4) 1205. The user can access the matter and call up the status report form for the matter 1206, and the facility will generate the status report form with the fields for the required data 1207. The user can then enter the data in the status report form, and save the form 1208. The facility will save and display the status report, and may save data to other portions of the facility (e.g., if the status report form included a case assessment document that was attached, the attached document will be saved in the documents folder for the matter; or if the data includes an estimated resolution date, the data will be saved in the matter profile for the matter) 1209. Once the status report has been submitted that satisfies the requirement for the data that is required and due, the outside vendor user (or another outside vendor user for the same vendor) can submit an invoice to the matter so long as no other data is required and due for the matter 1210.

FIGS. 13A & 13B are display diagrams showing examples of web page forms that might be presented to the responsible user (and his or her delegates) of the outside vendor so that such user can provide the required status report data. FIG. 13A shows an example of the first status report input form 1300 for the matter that might be presented to the responsible user of the outside counsel. The form has a field to specify the current status 1310, a field to specify the total budget for the matter 1320, and fields to enter the monthly fees 1330 and expenses 1331 for each month of the current fiscal year, together with a field to enter a description of the activities for the applicable month 1332. FIG. 13B shows an example of the $3^{rd}$ month status report input form 1350 for the same matter that might be presented to the responsible user of the outside counsel. In this example, the form has a field to specify the current status 1351, fields to specify the estimates of exposure and recovery for the matter 1360-1363, fields to specify the estimated resolution of the matter 1370, 1371, a field to attach a file (such as a Microsoft Word document) that contains a case analysis for the matter 1380, and the budget displayed with a selection to confirm the budget 1390 or a link to update and correct the budget 1391. In other words, the data object which is in the form of a status report can change for each status report to display the required information that must be completed or updated at the time the status report is submitted. While various embodiments of a status report form are described above, those skilled in the art will appreciate that the facility may provide other fields for data in the status report form.

While FIGS. 5-13B describe how the facility may be set up to require information relating to matter information, budgets, and status reports, other embodiments of the facility may require other types of information be provided by the outside vendor in a similar manner. For example, the facility may provide companies the ability to require spending accrual information monthly, quarterly, and/or for the end of each fiscal year, and when such spending accrual information becomes due. Similar to required matter information, budgets, and status reports, the facility would provide a form to allow the outside vendor to enter such spending accrual information, and would not allow the outside vendor to post an invoice if the spending accrual information is due for a specific matter but has not been provided by the outside vendor (or some facilities may require the spending accrual information be provided for all matters of the outside vendor before the outside vendor may submit an invoice to any matter).

FIG. 14A is a flow diagram showing steps associated with the submission of an electronic invoice to a specific matter, and whether the facility allows the invoice to be posted. The company first creates system-level requirements for data 1401, or sets requirements for data when a matter is created 1402. Then, after an outside vendor user logs into the facility 1403, and then attempts to submit an invoice to a matter 1404, the facility performs a check of the currentness of the information for which the vendor is responsible, and is required at the time of the submission of the invoice 1405. If the applicable fields have not been completed, the facility will not allow the invoice to be submitted 1406. (As shown in FIG. 14C, the facility may not even allow the outside vendor to submit the invoice, or the facility may allow the vendor to submit the invoice but reject the invoice after determining that information is due.) The facility alerts the outside vendor user attempting to post the invoice that the invoice cannot be submitted until all the required information has been provided 1407. If information is due, an outside vendor user responsible for the information that is due must first provide the information 1408 before the invoice can be submitted 1404. If all of the required information has been provided, the facility will allow the invoice to be submitted 1409.

FIG. 14B is a flow diagram showing examples of the checks the facility conducts to determine if information is due and therefore the facility will not allow the invoice to be posted. For example, the facility might check the field or fields that the outside vendor was required to complete regarding information about the matter (such as the law firm matter number, the applicable country for the matter, the applicable state for the matter, etc.) 1451. If the applicable fields have not been completed, the facility will not allow the invoice to be submitted 1450.

In some embodiments, that facility checks when the next status report is due 1452. If the next status report due date is equal to or earlier than today's date then the facility will not allow the invoice to be submitted until the status report has been entered into the facility by the outside vendor user (or his or her delegate) responsible for the status report 1450. The content of the status report will be controlled by the facility-level and matter-level settings with respect to the required information described in FIGS. 2A, 2B, and 3.

In some embodiments, the facility checks when the next budget is due 1453. If the next budget due date is equal to or earlier than today's date, then the facility will not allow the invoice to be submitted until the budget has been submitted into the facility 1450.

In some embodiments, the facility checks to see if other information has not been completed that has been required by either the company or the operator of the matter management facility 1454. If the information has not been provided, then the facility will not allow the invoice to be submitted until the information has been entered in the facility 1450.

In some embodiments the facility checks to see if other condition or conditions have not been satisfied that are required by either the company or the operator of the matter management facility 1455. If the condition or conditions have not been satisfied, then the facility will not allow the invoice to be submitted until the condition or conditions have been satisfied 1450.

Depending on the implementation of the facility, the facility may require some or all of checks described in FIG. 14B before the outside vendor can submit an invoice. If all of the required data has been provided and all conditions have been satisfied for submitting an invoice, the outside vendor may submit an invoice 1456.

The facility may have several different methods by which it will not allow an outside vendor to submit an invoice if information is due. For example, the facility may allow the outside vendor to initially submit the invoice in the facility, but if information is due the facility will produce a message stating that the invoice may not be posted because information is due, and the facility will then reject the invoice. In such an embodiment, the invoice is not saved by the facility, and the outside vendor must resubmit the invoice when all of the information has been required. In another embodiment, the facility may not even present the interface for submitting an invoice. FIG. 14C is a display diagram showing an example of a web page form 1470 used by an outside vendor to submit an invoice. In this particular embodiment, if a vendor has provided all required information for a matter, the facility will present a link 1471 that the outside vendor may click on to submit its invoice. If, however, the vendor has not provided all required information for a matter (as shown by the incomplete task notice 1472), the facility will not provide a link to submit the invoice.

FIGS. 15 through 22 describe how some embodiments the facility track the accuracy and currentness of information being provided, and produce metrics of such accuracy and currentness, and provide notice about the accuracy of the information to (i) the person responsible for providing the information, (ii) that person's supervisor at the outside vendor, and (iii) to company users, for the purpose of improving the awareness of the person responsible about the importance of providing accurate and current information. FIG. 15 is flow diagram showing examples of how the facility might accomplish this objective. After the company specifies the data that is required and when it is required 1501, and once the outside vendor user responsible for the data logs into the system 1502, if data is required, the facility alerts the responsible user (and his or her delegate) 1503, who can then provide the required data 1504. The facility tracks the accuracy and currentness of the data being provided 1505, and/or provides a means of company users to provide input about the accuracy and currentness of data provided by the outside counsel 1506. The facility produces metrics using the data provided by the outside vendor and other outside vendors, and/or data input by company users about the accuracy and currentness of the data 1507. The facility notifies the responsible person and/or supervisors of the responsible person, notifying the responsible person of the responsible person's metrics with respect to information provided by the responsible person (or his or her delegates) 1508. The responsible person and/or supervisors of the responsible person can then login to the facility and review the metrics 1509. Company users can also view the metrics 1510, and use the metrics when selecting new outside counsel for a new matter 1511.

There are many types of metrics that the facility might use to assess the accuracy and currentness of information being provided. For example, FIG. 16 is a table diagram showing how the facility might track all revisions to a specific field or type of data, such as the estimate exposure or resolution amount for a litigated matter. Each time the outside vendor's estimate of exposure or resolution is changed (whether in the matter fields or by means of a status report), the facility maintains a record of each update in the exposure table for the matter 1600, and saves the date of the change and the name of the person who provided the update. The exposure table 1600 is comprised of rows, such as rows 1601-1604, each corresponding to a change in the outside vendor's estimate of exposure. Each row is divided into a matter object ID column 1606; the matter name 1607; a user ID code identifying the outside vendor user who modified the estimate of exposure 1608; the ID of the outside vendor associated with the user who modified the estimate of exposure 1609; the date the outside vendor user made an update to the estimate of exposure 1610; and the estimate of exposure 1611. The last row 1605 in the exposure table 1600 contains the actual exposure in the exposure column 1611. While the exposure table in FIG. 16 shows changes to the exposure only for a single matter, those skilled in the art will appreciate that the exposure table could be designed to contain updates to exposure estimates for multiple matters, or for all matters in the facility.

While FIG. 16 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 17 is a display diagram showing how the facility might use data saved in the exposure table to produce two different graphs of accurateness. The first graph 1700 displays the variance between the predicted exposure against the actual exposure (i.e., the X-axis 1701 of the graph) over time (which is the Y-axis 1702 of the graph). One line of the graph might display the variance for this particular matter 1703. Another line of the graph might display the average variance of all responsible users across all their matters 1704. The second graph 1750 displays the percentage of the predicted exposure to the actual exposure (i.e., the X-axis 1751 of the graph) over time (which is the Y-axis 1752 of the graph). One line of the graph might display the percentage 1753 for this particular matter. Another line of the graph might display the average percentage 1754 of all responsible users across all their matters.

Other embodiments of the facility might use subjective means to assess the accuracy and currentness of information. For example, FIG. 18 is a display diagram showing an example of a web page form that a company user fills out about the assessing the accurateness and currentness of the information provided by the outside vendor during the life of the matter 1800. One or more of the questions in the evaluation form provide a means to rate the accuracy and currentness of the information 1801 provided by the outside vendor 1802 and/or responsible person at the outside vendor 1803. The evaluation form may provide a scale (e.g., 1-5) to grade the accuracy and currentness of the information 1804. The facility can then produce a variety of assessments using this subjective evaluation data.

FIG. 19 is a table diagram showing typical information saved by the facility about the subjective evaluation completed in FIG. 18 to enable the facility to generate metrics about the outside vendor performance. The evaluation table 1900 is comprised of rows, such as rows 1901-1905, each corresponding to an evaluation. The table typically contains a row for every evaluation made by company users in the facility. Each row is divided into a matter object ID column 1906; the matter name 1914; a user ID code identifying the outside vendor user about which the evaluation was supplied 1907; the user ID of the company person who provided the evaluation 1908; the company person's average rating given by the company person in all prior evaluations 1909; the date of the evaluation 1910; the rating for various other categories of the user's performance in the matter 1911 (which may be multiple different categories); a rating for the accurateness of the information provided by the outside vendor user 1912; and the average rating given by all company persons in all prior evaluations 1913. The facility can determine from the data in each row to produce a variety of metrics about the accuracy and currentness of the data provided by the outside vendor. For example, for a specific evaluation, the accuracy rating can be compared to the average accuracy rating in all evaluations (which can be determined by summing all the accuracy evaluation ratings in the table and dividing by the number of evaluations). Alternatively, the percentile rank of the accuracy rating for the outside vendor user for the specific matter could be determined. For example, in table 1900, in the evaluation for matter object 1000 1901, the percentile rank would be the $40^{th}$ percentile. Additional metrics that can be derived from the table are discussed in connection with FIG. 20.

FIG. 20 is a display diagram showing an example of the types of metrics that can be generated and displayed using the subjective evaluation data. The subjective evaluation ratings for an outside vendor user 2001 for a specific matter 2002 are shown 2000. The display lists the ratings made by the company user (which includes a rating for predictive accuracy) 2003. In this particular embodiment, the display also shows the deviation of the subjective evaluation rating from the average rating by the evaluator 2004 and the percentile rank of the deviation (i.e., the deviation that is greater than all other deviations in the facility would be the $100^{th}$ percentile) 2005. In this particular embodiment, the display also shows the average evaluation rating for this outside vendor user 2006, the average of the deviations for all of the evaluation ratings for this particular outside vendor user 2007, and the percentile rank of the average deviation 2008.

While various embodiments of methods to assess the accuracy and currentness of information described above, those skilled in the art will appreciate that the facility may have other methods of assessing the accuracy and currentness of information being provided.

The generation of the foregoing metrics serves several purposes to help ensure the accuracy and currentness of information provided by the submitter of an electronic invoice. One purpose is to notify the responsible person and/or supervisors of the responsible person at the outside vendor) that the facility is tracking such information, and may be used by the company as the basis for hiring the outside vendor for new work. For example, in some embodiments, the facility may send an email message to the responsible person and/or supervisors of the responsible person, notifying the responsible person of the responsible person's metrics with respect to the matter. FIG. 21 is a display diagram of such an email message 2100. In this particular embodiment, the email provides metrics or other ratings about the accurateness of the data and estimates provided during the life of the matter by the outside vendor users 2101. The email also notifies the lead outside counsel user responsible for the matter that (i) the metrics will be saved as part of the responsible person's file and associated vendor file in the facility 2102, (ii) the metrics may viewed by the company and compared to metrics of other responsible users and metrics from other matters 2103, and (iii) the metrics may considered as a factor by the company when assigning new work to outside vendors 2104. It will be understood by those skilled in the art that facility may provide other notifications, alerts, communications, or means to enable the client to provide notifications, alerts, or communications to the responsible outside vendor and the responsible person at the outside vendor.

Another purpose is to enable enables company users and supervisors at outside vendors to review the accuracy and currentness metrics by a responsible person at an outside vendor, and be able to compare those metrics to the metrics of other responsible persons, or aggregate metrics across groups of responsible persons or across groups of specified types of matters. FIGS. 17 & 19 are examples of the types of reports that company users could view. Furthermore, the facility may also provide a method for companies to use such metrics when selecting the outside vendor and person responsible for new matters. FIG. 22 is a display diagram showing the view a company user could access when trying to select an outside vendor to represent the company on a new matter. The display shows a web search page 2200 that a company user can access when selecting the outside vendor user for a matter, which allows the company user to select a list of users using a variety of search criteria (which may include accuracy criteria) 2201, and then from the search results 2202, compare accuracy metrics for users 2203. The results may contain other information that is also relevant to the selection of the outside vendor user 2204. When a company user clicks the user's name which is a hyperlink 2205, the user is then selected for the matter and saved in the matter profile for the matter.

It will be understood by those skilled in the art that the above-described facility could be adopted or extended in various ways. For example, the facility may be used to manage information about vendors of vendor types other than law firms, for which kinds of information other than those discussed herein are required. While the foregoing description makes reference to preferred embodiments, the scope of the invention is defined solely by the claims that follow and the elements recited therein.

We claim:

1. A method in a server computing system having a processor and memory for ensuring currentness of information provided by a submitter of an electronic invoice relating to a representation by the submitter of a client, comprising:
   receiving, by the server computing system, an identification of information that is to be periodically collected from the submitter of the electronic invoice in connection with the representation by the submitter of the client, wherein the information that is to be periodically collected is distinct from the electronic invoice;
   receiving, by the server computing system, an indication of a time by which the information is to be collected from the submitter;
   transmitting, by the server computing system, an alert to the submitter to indicate at least a portion of the information that is to be periodically collected is due based on the indication of the time by which the information is to be collected, wherein the alert comprises a first hyperlink that, when activated by the submitter, causes presentation of a user interface that provides the submitter with access to the server computing system, wherein the access to the server computing system is configured to enable the submitter to input the information that is to be periodically collected;
   receiving, by the server computing system from a computer system of the submitter, the information via inputs to the user interface that provides the submitter with access to the server computing system subsequent to transmitting the alert;
   providing, by the server computing system to the computer system of the submitter, a second hyperlink to an invoice submission user interface in response to the computer system of the submitter providing the at least the portion of the information that is due to the user interface;
   receiving, by the server computing system from the computer system of the submitter, an invoice via the invoice submission user interface;
   preventing, by the server computing system, invoice submission by the computer system of the submitter prior to the computer system of the submitter providing the at least the portion of the information that is due to the user interface; and
   storing, by the server computing system, the information in a data structure.

2. The method of claim 1, wherein the submitter is a law firm and the representation relates to a legal matter.

3. The method of claim 1, wherein the identified information comprises a matter budget.

4. The method of claim 1, wherein the identified information comprises a matter status report.

5. The method of claim 1, wherein the identified information comprises a matter cost estimate.

6. The method of claim 1, further comprising:
   periodically providing notifications to the submitter, each notification identifying any information required for any of a plurality of matters in which the submitter is representing the client that (1) have not been provided and (2) have a time to be collected from the submitter that is not in the future.

7. The method of claim 1, further comprising:
   testing, by the processor, an accuracy of the information collected from the submitter;
   generating, based on the tested accuracy of the information collected from the submitter, a predictive accuracy metric relating to the representation by the submitter of the client; and
   generating, by the server computing system, a signal representing a display of a visual representation of the predictive accuracy metric; and
   transmitting, by the server computing system, the signal representing the display of the visual representation to the computer system of the submitter.

8. A server computing system for ensuring currentness of information provided by a submitter of an electronic invoice relating to a representation by the submitter of a company, the server computing system comprising:
   a processor;
   a memory storing program instructions that cause the server computing system perform operations including:
      receiving, by the server computing system, an identification of information that is to be periodically collected from the submitter of the electronic invoice in connection with the representation by the submitter of a client, wherein the information that is to be periodically collected is distinct from the electronic invoice;
      receiving, by the server computing system, an indication of a time by which the information is to be collected from the submitter;
      transmitting, by the server computing system, an alert to the submitter to indicate at least a portion of the information that is to be periodically collected is due based on the indication of the time by which the information is to be collected, wherein the alert comprises a first hyperlink that, when activated by the submitter, causes presentation of a user interface that provides the submitter with access to the server computing system, wherein the access to the server computing system is configured to enable the submitter to input the information that is to be periodically collected;
      receiving, by the server computing system from a computer system of the submitter, the information via inputs to the user interface that provides the submitter with access to the server computing system subsequent to transmitting the alert;
      providing, by the server computing system to the computer system of the submitter, a second hyperlink to an invoice submission user interface in response to the computer system of the submitter providing the at least the portion of the information that is due to the user interface;
      receiving, by the server computing system from the computer system of the submitter, an invoice via the invoice submission user interface;
      preventing, by the server computing system, invoice submission by the computer system of the submitter prior to the computer system of the submitter providing the at least the portion of the information that is due to the user interface; and
      storing, by the server computing system, the information in a data structure.

9. The server computing system of claim 8, wherein the submitter is a law firm and the representation relates to a legal matter.

10. The server computing system of claim 8, wherein the identified information comprises a prediction of matter outcome.

11. A non-transitory computer-readable storage medium storing program instructions that cause a server computing system having a processor to perform operations comprising:

- receiving, by the server computing system, an identification of information that is to be periodically collected from a submitter of an electronic invoice in connection with a representation by the submitter of a client, wherein the information that is to be periodically collected is distinct from the electronic invoice;
- receiving, by the server computing system, an indication of a time by which the information is to be collected from the submitter;
- transmitting, by the server computing system, an alert to the submitter to indicate at least a portion of the information that is to be periodically collected is due based on the indication of the time by which the information is to be collected, wherein the alert comprises a first hyperlink that, when activated by the submitter, causes presentation of a user interface that provides the submitter with access to the server computing system, wherein the access to the server computing system is configured to enable the submitter to input the information that is to be periodically collected;
- receiving, by the server computing system from a computer system of the submitter, the information via inputs to the user interface that provides the submitter with access to the server computing system subsequent to transmitting the alert;
- providing, by the server computing system to the computer system of the submitter, a second hyperlink to an invoice submission user interface in response to the computer system of the submitter providing the at least the portion of the information that is due to the user interface;
- receiving, by the server computing system from the computer system of the submitter, an invoice via the invoice submission user interface;
- preventing, by the server computing system, invoice submission by the computer system of the submitter prior to the computer system of the submitter providing the at least the portion of the information that is due to the user interface; and
- storing, by the server computing system, the information in a data structure.

12. The non-transitory computer-readable storage medium of claim 11, wherein the submitter is a law firm and the representation relates to a legal matter.

13. The non-transitory computer-readable storage medium of claim 11, wherein the identified information comprises a statement of accrued costs.

14. The non-transitory computer-readable storage medium of claim 11, the operations further comprising:

- periodically providing notifications to the submitter, each notification identifying any information required for any of a plurality of matters in which the submitter is representing the client that (1) have not been provided and (2) have a time to be collected from the submitter that is not in the future.

* * * * *